(12) United States Patent
Hasenberg et al.

(10) Patent No.: US 9,962,755 B2
(45) Date of Patent: May 8, 2018

(54) HAND HELD FLARING TOOL

(71) Applicant: American Grease Stick Company, Muskegon, MI (US)

(72) Inventors: Mark J. Hasenberg, Kenosha, WI (US); Logan D. Pitts, North Muskegon, MI (US)

(73) Assignee: AGS COMPANY AUTOMOTIVE SOLUTIONS, LLC, Pittsburgh, PA (US)

( * ) Notice: Subject to any disclaimer, the term of this patent is extended or adjusted under 35 U.S.C. 154(b) by 369 days.

(21) Appl. No.: 14/528,575

(22) Filed: Oct. 30, 2014

(65) Prior Publication Data
US 2015/0114068 A1 Apr. 30, 2015

Related U.S. Application Data

(60) Provisional application No. 61/897,258, filed on Oct. 30, 2013.

(51) Int. Cl.
*B21D 41/02* (2006.01)
*B23B 31/20* (2006.01)

(52) U.S. Cl.
CPC ............ *B21D 41/021* (2013.01); *B23B 31/20* (2013.01)

(58) Field of Classification Search
CPC ...... B21D 41/02; B21D 41/021; B21D 19/08; B21D 19/10; B21D 41/025; B23B 31/20; B23B 31/208; Y10T 279/17307; Y10T 279/17521; Y10T 279/17529
See application file for complete search history.

(56) References Cited

U.S. PATENT DOCUMENTS

| | | | |
|---|---|---|---|
| 1,643,609 A | 9/1927 | Roepke | |
| 2,211,622 A | * 8/1940 | Hunziker | B21K 25/00 285/256 |
| 2,438,999 A | 4/1948 | Hartley et al. | |

(Continued)

FOREIGN PATENT DOCUMENTS

CN 201150965 11/2008

OTHER PUBLICATIONS

International Search Report and Written Opinion dated Feb. 19, 2015 from corresponding PCT Application No. PCT/US2014/063138 filed Oct. 30, 2014.

*Primary Examiner* — R. K. Arundale
*Assistant Examiner* — Mohammad Yusuf
(74) *Attorney, Agent, or Firm* — Honigman Miller Schwartz and Cohn LLP; Timothy A. Flory

(57) ABSTRACT

A flaring tool is provided for flaring an end of a pipe or tube. The tool includes a locking mechanism having a collar and a collet with two or more collet pieces that engage the collar prior to and during a flaring operation. The collet can receive a pipe or tube when the collet is in an expanded or open position. The collet pieces have external flanges for engaging the collar during clamping and unclamping of the tube, each flange having first and second flange portions that sequentially engage an inner surface of the collar, the first flange portion guiding insertion of the collet into the collar and the second flange portion causing the collet pieces to clamp onto the tube. A flaring mechanism moves a flaring mandrel towards the end of the tube when the collet is clamped, whereby the mandrel engages and flares the end of the tube.

20 Claims, 30 Drawing Sheets

(56) References Cited

U.S. PATENT DOCUMENTS

| | | | |
|---|---|---|---|
| 2,478,102 | A | 8/1949 | Hull et al. |
| 2,480,762 | A | 8/1949 | Parker |
| 2,664,619 | A | 1/1954 | Hahn et al. |
| 2,993,522 | A | 7/1961 | Temple et al. |
| RE25,131 | E | 3/1962 | Wilson |
| 3,192,758 | A | 7/1965 | Catlin et al. |
| 3,194,040 | A | 7/1965 | Rasmussen |
| 3,393,549 | A | 7/1968 | Gregg |
| 3,470,724 | A | 10/1969 | Gregg |
| 3,771,343 | A | 11/1973 | Dawson |
| 3,820,375 | A | 6/1974 | Koski |
| 3,863,940 | A * | 2/1975 | Cummings ........... B23B 31/202 279/43 |
| 4,606,214 | A | 8/1986 | Miyazaki |
| 5,090,226 | A | 2/1992 | Takeoka et al. |
| 5,228,323 | A | 7/1993 | Dubinsky et al. |
| 5,782,128 | A | 7/1998 | Barjesteh et al. |
| 5,956,987 | A | 9/1999 | Anthoine |
| 6,508,097 | B2 | 1/2003 | Ose |
| 6,619,099 | B2 | 9/2003 | Barjesteh |
| 7,114,423 | B2 | 10/2006 | Kelley |
| 7,318,334 | B2 | 1/2008 | Carter |
| 7,353,682 | B2 | 4/2008 | Buchanan |
| 7,604,472 | B2 | 10/2009 | Hayes, Jr. et al. |
| 2001/0035038 | A1 * | 11/2001 | Ose ....................... B21D 41/04 72/316 |
| 2010/0084039 | A1 | 4/2010 | Hayes, Jr. et al. |
| 2010/0263202 | A1 | 10/2010 | Baba |
| 2011/0247386 | A1 | 10/2011 | Buchanan |
| 2013/0133394 | A1 | 5/2013 | Hasenburg et al. |

* cited by examiner

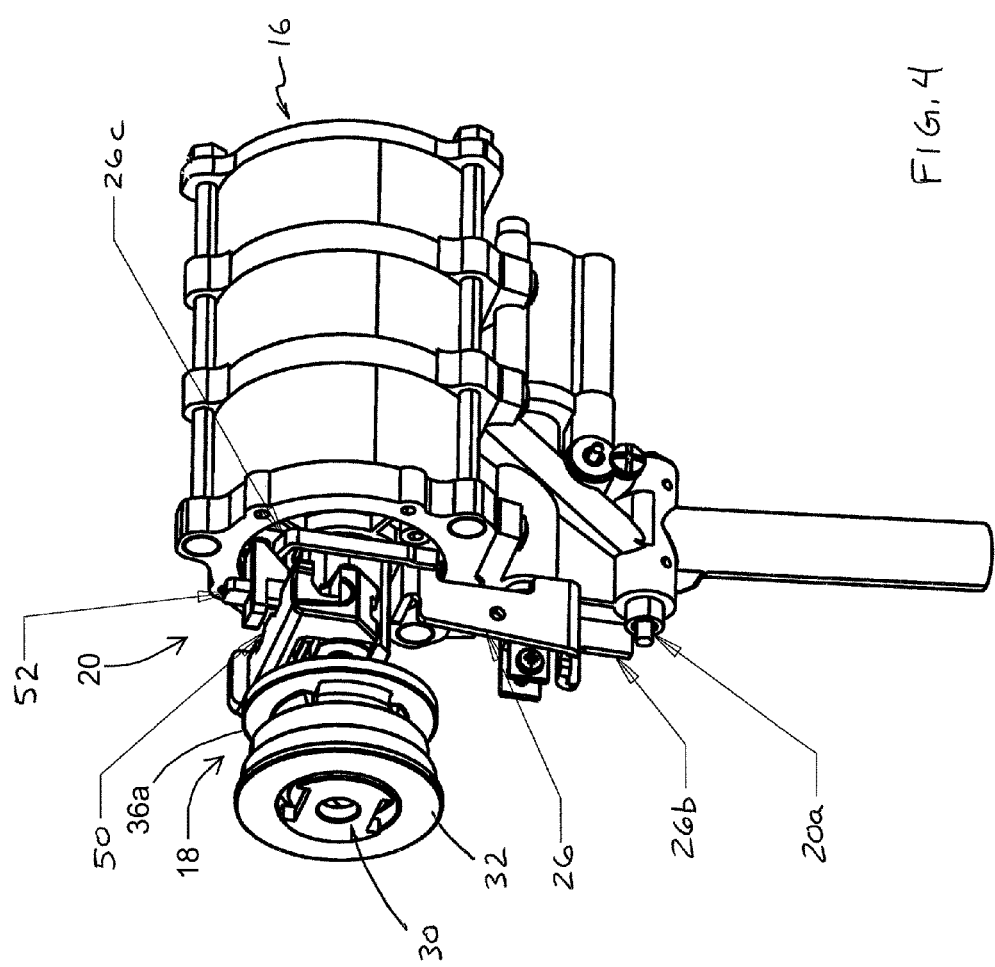

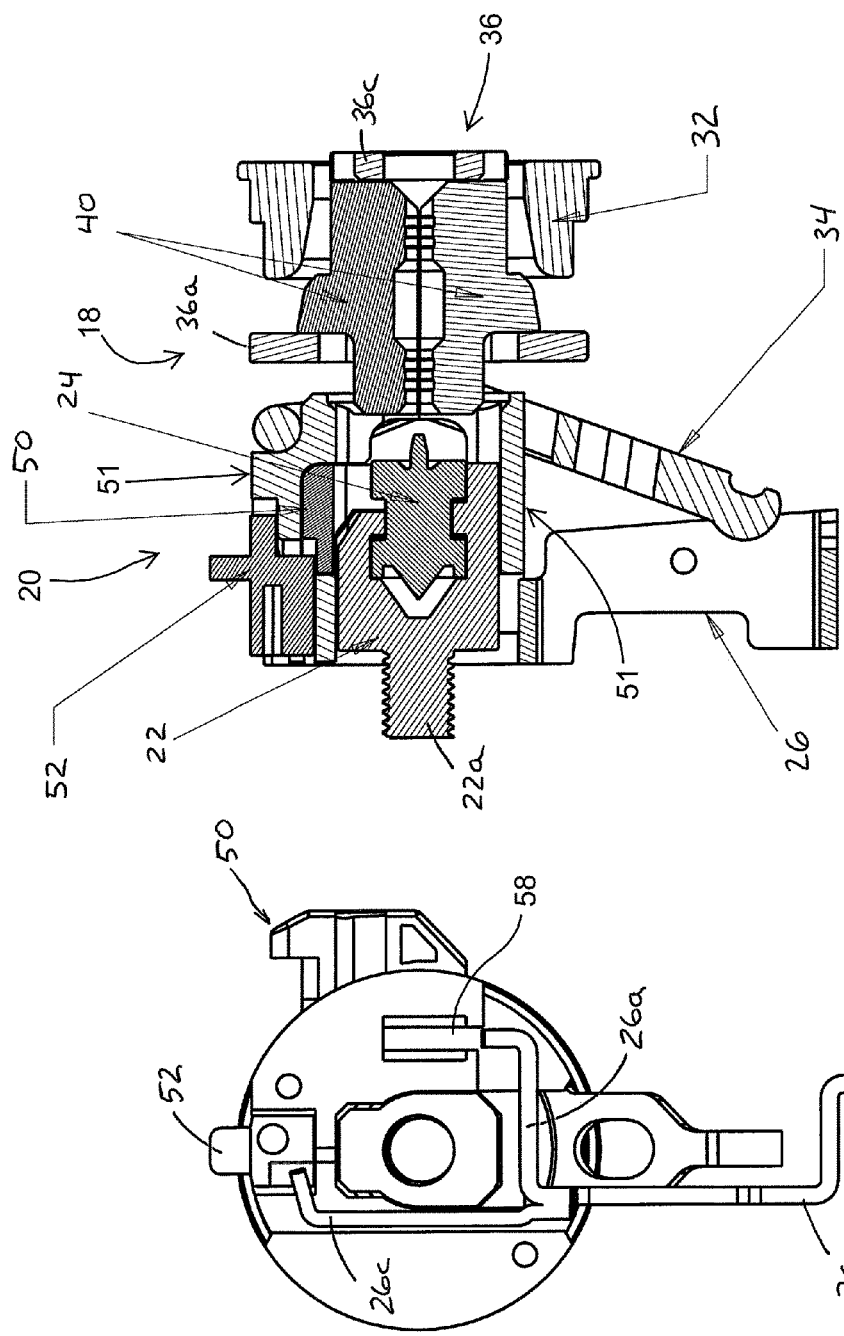

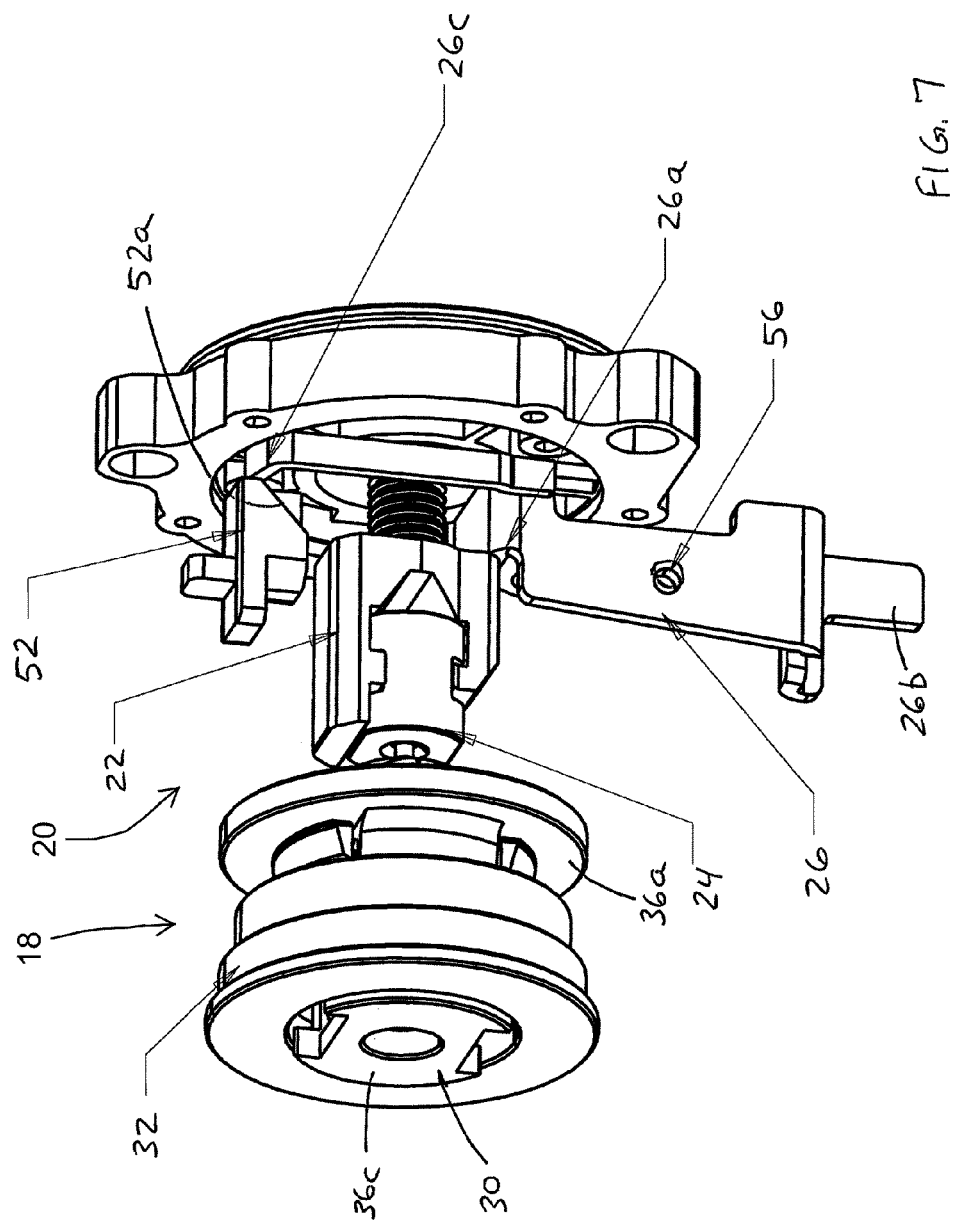

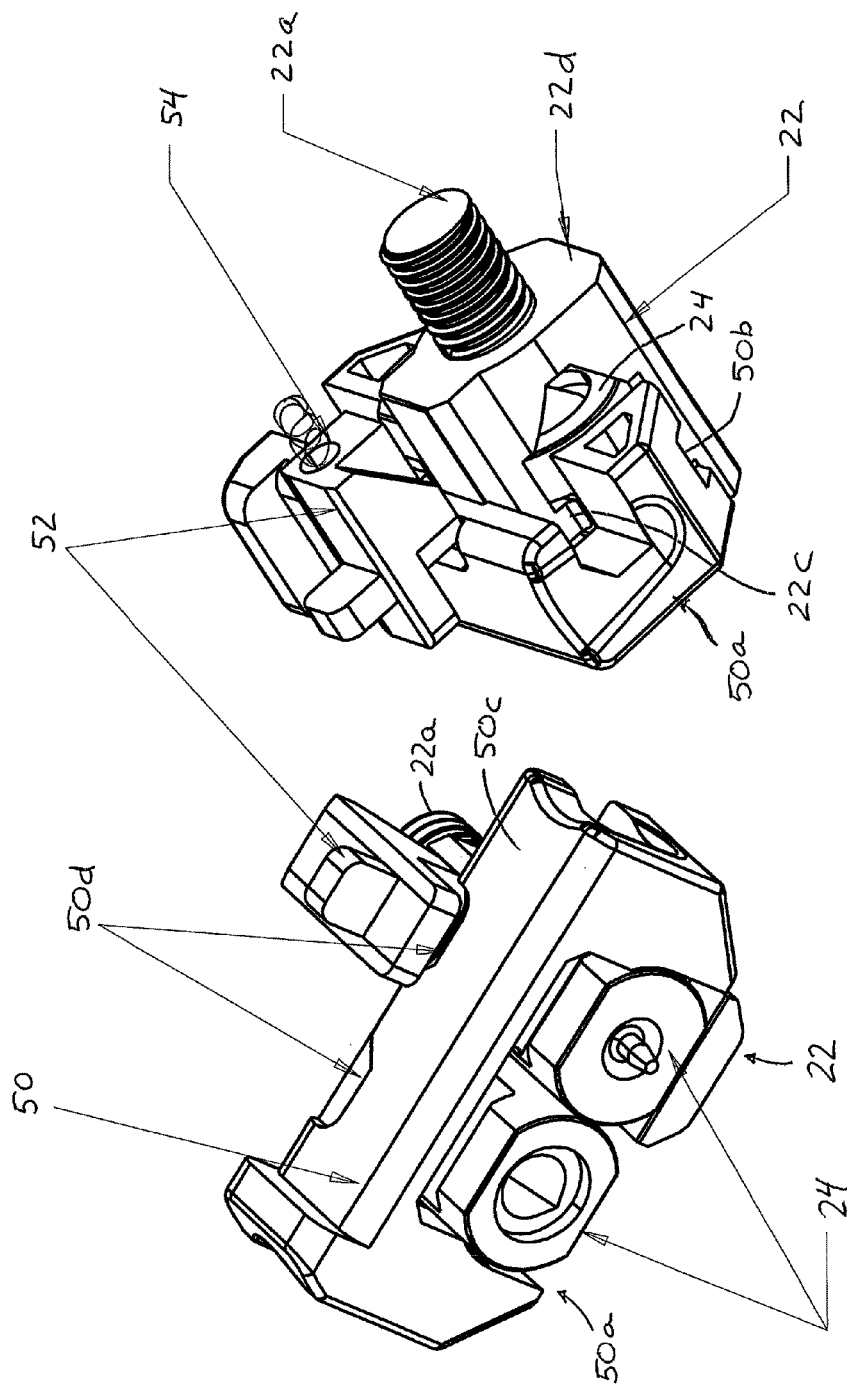

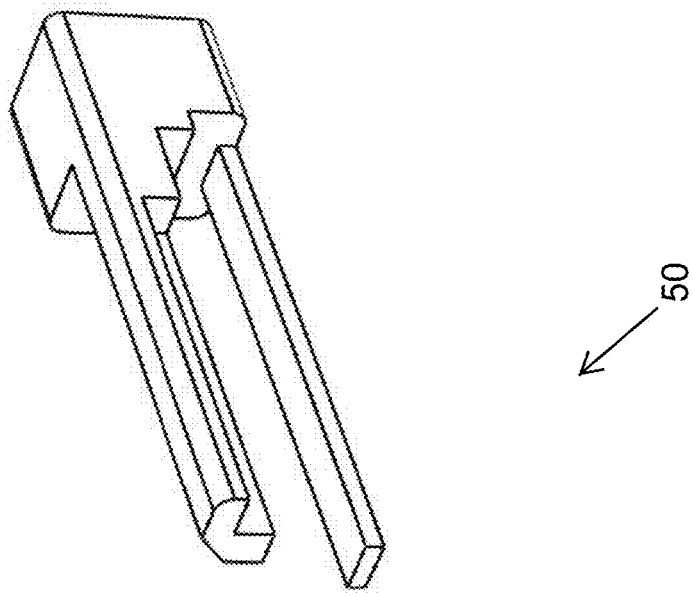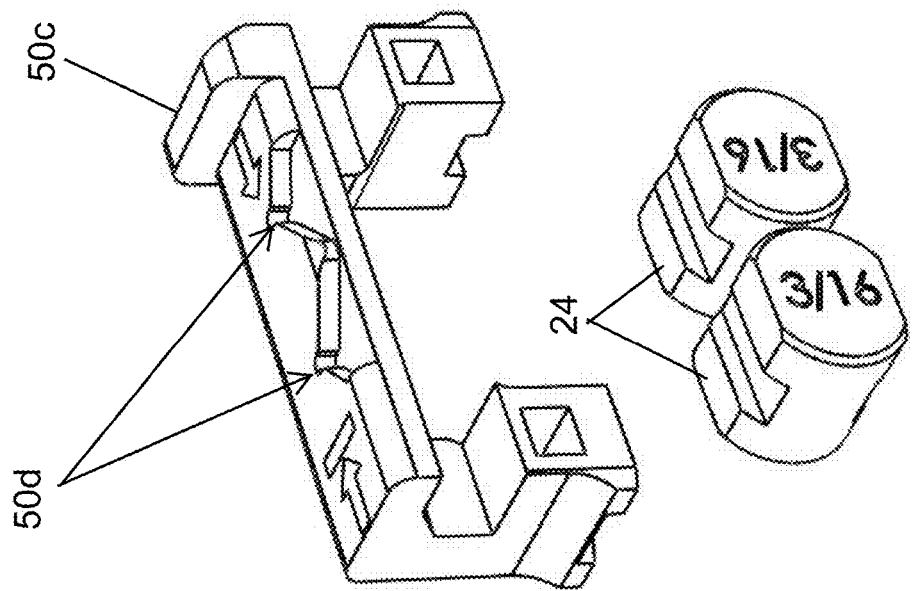
FIG. 27B

HAND HELD FLARING TOOL

CROSS REFERENCE TO RELATED APPLICATION

The present application claims the filing benefits of U.S. provisional application Ser. No. 61/897,258, filed Oct. 30, 2013, which is hereby incorporated herein by reference in its entirety.

FIELD OF THE INVENTION

The present invention relates generally to flaring tools for flaring an end of a pipe or tube and, more particularly, to a hand held flaring tool for flaring an end of a pipe or tube of an automobile, such as a brake line or the like, at or near the automobile.

BACKGROUND OF THE INVENTION

Flaring tools are known and typically are cumbersome to use and require the use of both hands to clamp the tube at the tool and to flare end of the tube. Typically, it is difficult to set the depth of the tube into the flaring tool so that the flare is properly achieved.

SUMMARY OF THE INVENTION

The present invention provides a hand held flaring tool for flaring an end of a tube or pipe that is inserted into and secured or locked in the hand held flaring tool. The flaring tool may have a stop element or feature that readily sets the depth of the tube or pipe at the flaring tool and that allows the user to set the tube insertion depth, lock the tube in place and flare the end of the tube, all with the same hand held tool and without having to visually line up the end of the tube with the flaring tool and without having to use both hands to hold the tube and lock and flare the end of the tube. The flaring tool includes a multi-piece collet that is movable relative to a collar of the flaring tool to clamp the collet onto the tube, with the collet comprising an internal biasing element to urge the collet towards its expanded state when the collet is moved to and disposed at a larger diameter portion of the collar.

According to an aspect of the present invention, the flaring tool includes a collet that comprises a two-piece construction having opposite side or half portions that are configured to clamp tightly around the tube when the flaring tool is actuated and that, when released (after the tube is flared), move or separate a sufficient distance apart to allow for easy removal of the flared tube. The collet portions and the collar are constructed to have selected angles and shapes to allow for tight clamping onto the tube when the collet is moved into a collar and closed around the tube, yet a large passageway when the collet is moved away from the collar and opened, so that the flared tube may be readily removed upon completion of the flaring process.

According to another aspect of the present invention, the flaring tool includes a mandrel slide or sliding mandrel holder that holds or guides two different mandrels (such as a bubble flaring mandrel and a conical flaring mandrel) and allows the user to select a first flaring mandrel to flare the end of tube in one manner (such as a bubble flare) and then to select (via disengaging a lock and sliding the mandrel holder) a second flaring mandrel to flare the end of the tube in a second manner (such as a conical flare), without having to disassemble the flaring tool or replace the mandrel. The mandrel slide or carriage is movable to align the selected mandrel with the mandrel holder of the flaring tool that, when the flaring tool is actuated, moves the mandrel into engagement with the end of the tube clamped in the flaring tool and moves the mandrel to flare the tool in the desired or selected manner.

These and other objects, advantages, purposes, and features of the present invention will become apparent upon review of the following specification in conjunction with the drawings.

BRIEF DESCRIPTION OF THE DRAWINGS

FIG. 4 is a perspective view of the flaring tool of the present invention, with portions removed to show additional details;

FIG. 5 is an end elevation of a portion of the flaring tool of the present invention;

FIG. 6 is a sectional view of the flaring tool of the present invention;

FIG. 7 is an enlarged perspective view of a portion of the flaring tool of the present invention;

FIG. 24 is a perspective view of the mandrel slide and mandrel holder of the flaring tool of the present invention;

FIG. 25 is another perspective view of the mandrel slide and mandrel holder of FIG. 24;

FIG. 27B is a rear perspective view of the mandrel holder, mandrel slide, and mandrels of FIG. 27A;

DESCRIPTION OF THE PREFERRED EMBODIMENTS

Figure 1:
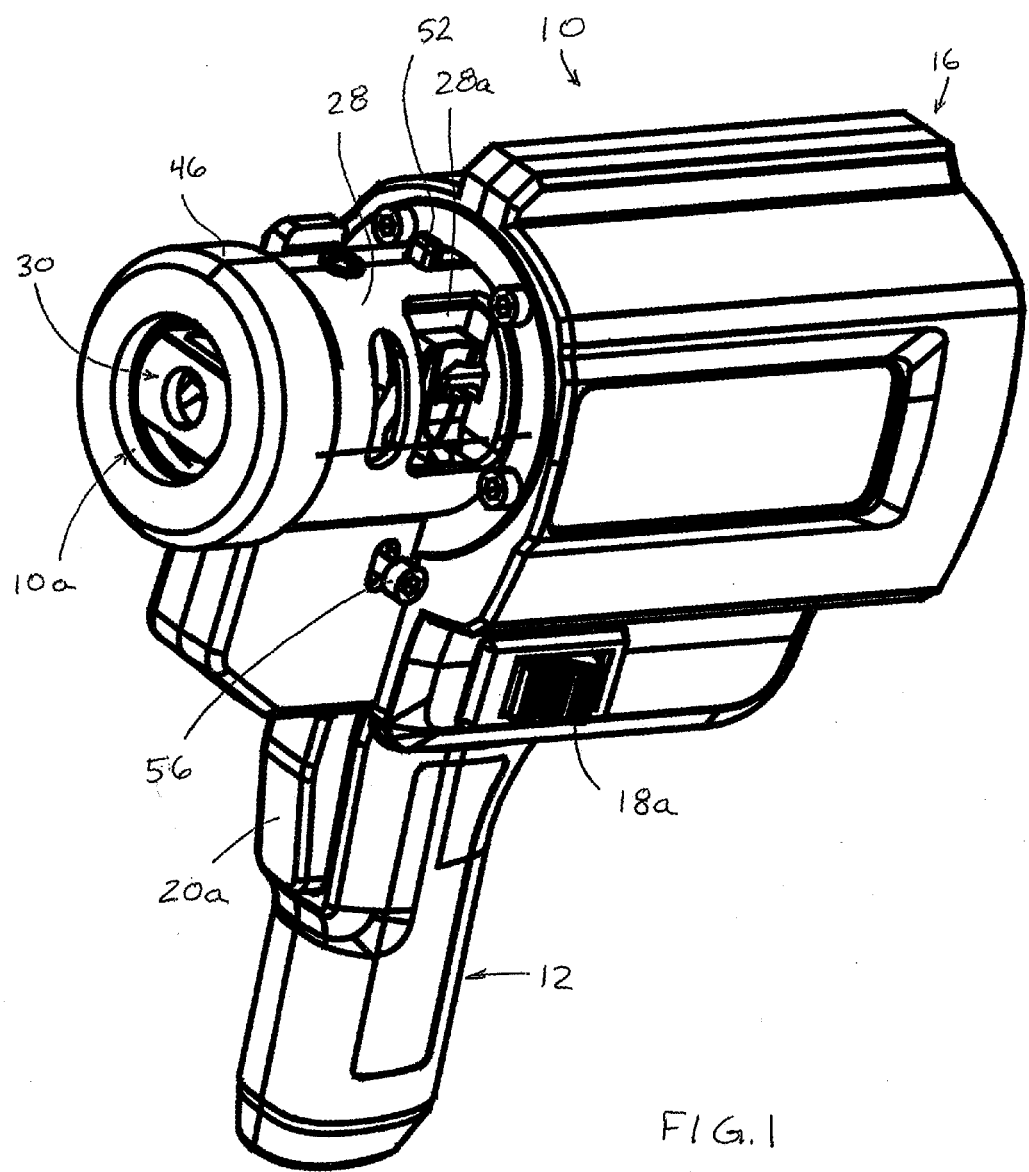
FIG. 1 is a perspective view of a hand held flaring tool in accordance with the present invention.
Figure 1A:
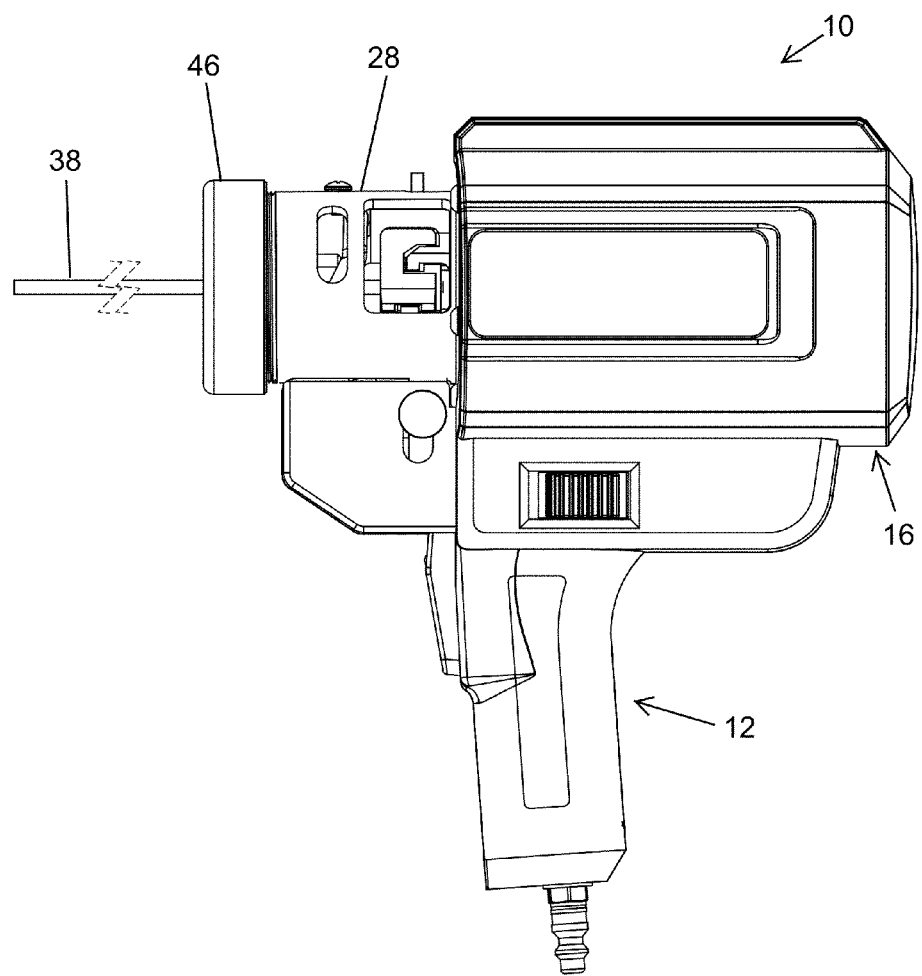
FIG. 1A is side elevation of a hand held flaring tool generally corresponding to that of FIG. 1.
Figure 1B:
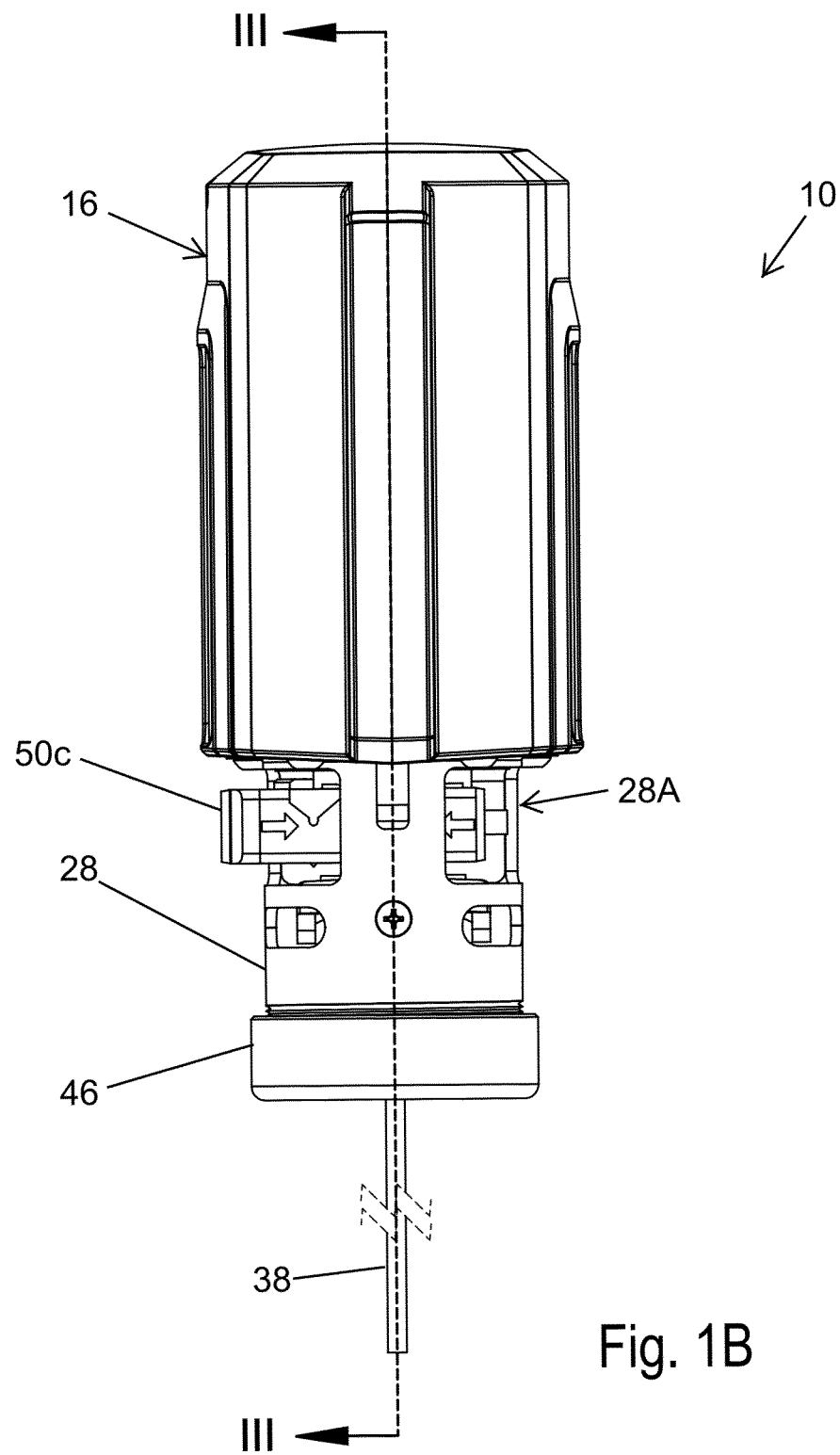
FIG. 1B is a top plan view of the hand held flaring tool of FIG. 1A.
Figure 2:
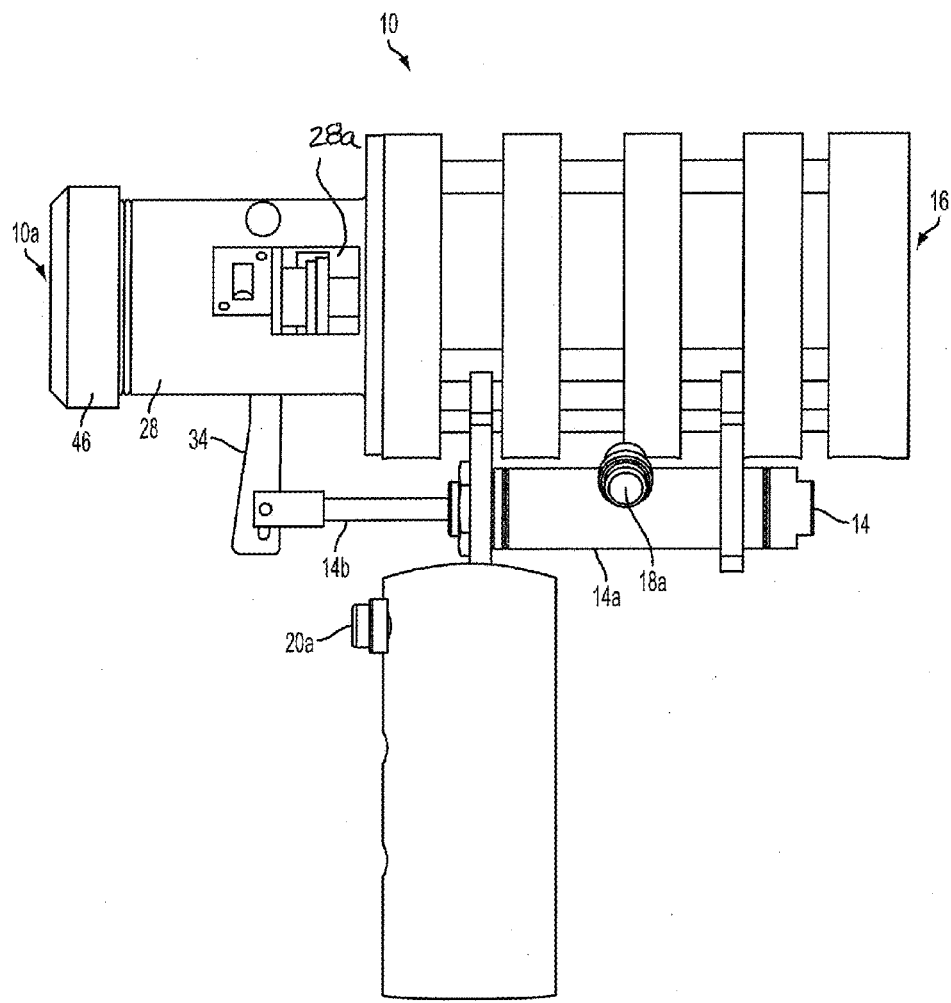
FIG. 2 is a side elevation of the flaring tool of FIG. 1, with portions removed to show additional details.
Figure 2A:
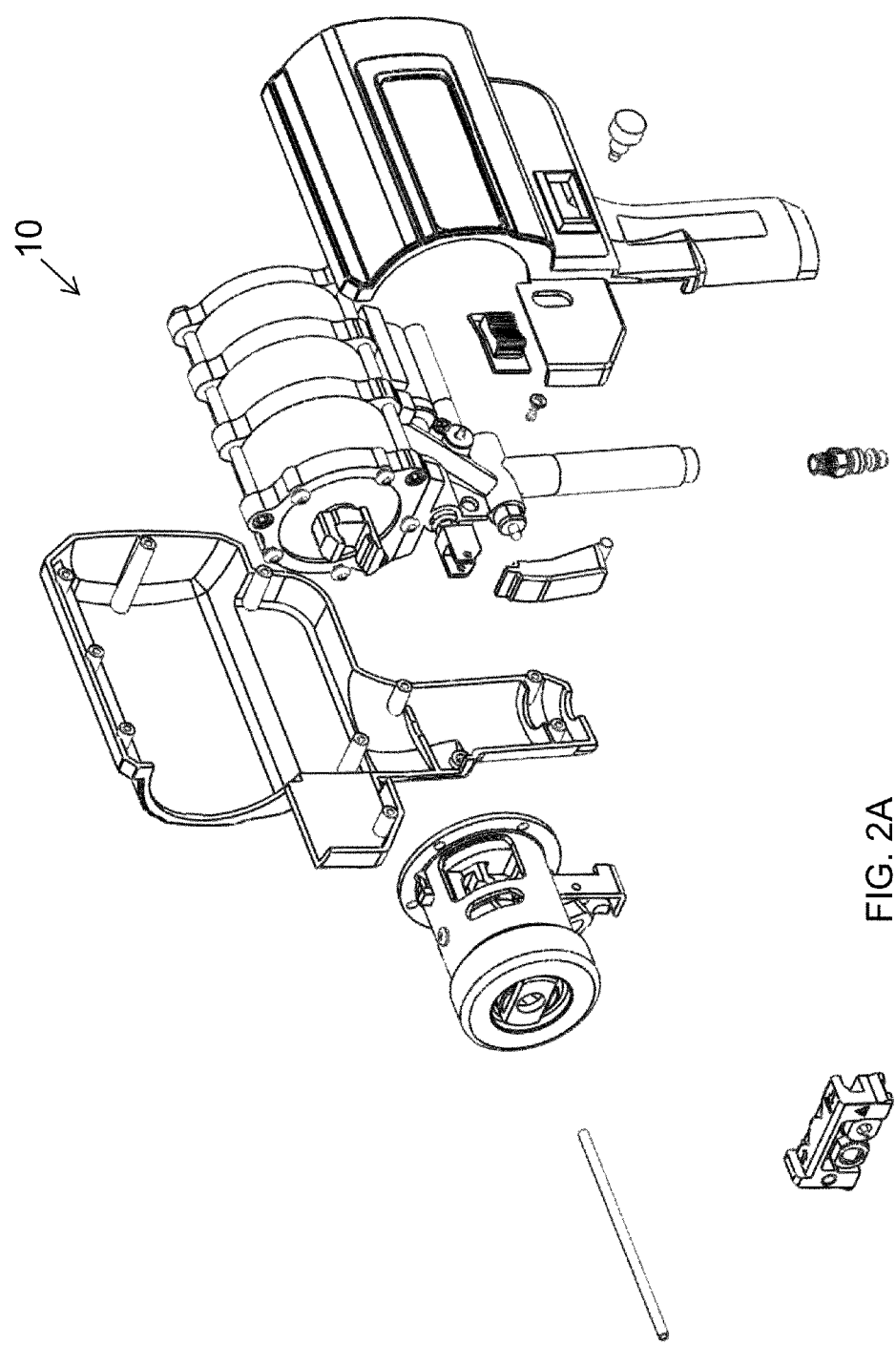
FIG. 2A is a partially-exploded perspective view of the flaring tool.

Referring now to the drawings and the illustrative embodiments depicted therein, a hand held flaring tool 10 comprises a handle portion 12, a locking actuator 14, a flaring actuator 16, a locking mechanism 18 and a flaring mechanism 20 (FIGS. 1 and 2). The tool 10 may be held by a user, who may first actuate the flaring mechanism 20 (such as via actuating a user input or button or switch 20a) to move a selected mandrel holder 22 and a mandrel 24 (FIG. 7) towards a flaring position, whereby the user may move a stop mechanism or element 26 into position behind the now moved or extended mandrel holder. Upon release of or deactuation of the flaring mechanism 20, the mandrel holder 22 retracts or returns towards its initial state until it contacts or engages the stop element 26, whereby the mandrel 24 is positioned at the appropriate position for the tool to receive a tube therein. The user may then insert a tube or pipe into the receiving end or portion 10a of the flaring tool 10, whereby the end of the tube or pipe will engage the mandrel 24 and is then at the desired or appropriate location and depth in the flaring tool. The user may then actuate the locking mechanism 18 (such as via actuating a user input or button or switch 18a) to lock the tube at the appropriate location and depth in the flaring tool 10, and then may actuate the flaring mechanism 20 (such as via actuating a user input or button or switch 20a) to flare the end of the tube to the desired form or shape, as discussed below. The flaring tool 10 thus may lock the tube at the desired or appropriate location and then flare the end of the tube, without the user having to visually align the tube at a particular location, as also discussed below. The flaring tool may utilize aspects of the flaring tools described in PCT Application No. PCT/US2011/046354, filed Aug. 3, 2011 and published Feb. 9, 2012 as International Publication No. WO 2012/018875, which is hereby incorporated herein by reference in its entirety.

As shown in FIGS. 1, 1A and 2-3, handle portion 12 comprises a generally cylindrical shaped handle or grip portion (or any suitable shape for a user's hand to readily grasp and conform to) and extends downward from the locking actuator 14 and flaring actuator 16 and the locking and flaring mechanisms 18, 20. User input 20a (for actuating the flaring mechanism 20) may be disposed at and accessible at the handle portion 12 and may comprise a button or trigger or switch at the handle portion for a user to readily press or squeeze or actuate while holding the handle portion 12 of flaring tool 10. Similarly, user input 18a (for actuating the locking mechanism 18) may be disposed at the handle portion 12 or may be disposed at or near the locking actuator 14, and may comprise a button or trigger or switch (such as a toggle or switch that may be locked or retained at the "on" position so the actuator 14, when locking the tube in the collet, may be kept on through the flaring process) at or near the handle portion for a user to readily press or squeeze or slide or actuate while holding the handle portion 12 of flaring tool 10. A user of the flaring tool thus may readily grasp and hold onto the handle portion to support the tool (and the tube or pipe inserted therein) during the flaring process, and may readily access and actuate the user inputs to clamp the locking mechanism onto the tube or pipe and to flare the end of the tube or pipe via the flaring mechanism. The flaring tool is sized to be small enough that a user can readily hold and support the flaring tool during the flaring process and may be able to use the flaring tool to flare an end of a tube or pipe that is already installed in the engine compartment of a vehicle or the like.

In the illustrated embodiment, the handle 12 is attached or supported at the locking actuator 14, which may comprise a pneumatic cylinder 14a or solenoid valve that extends and retracts a rod or piston 14b to actuate the locking mechanism 18 to clamp the tube in the flaring tool 10. Locking mechanism 18 is housed within a housing 28 of flaring tool 10. Housing 28 comprises a generally cylindrical housing that is disposed at an end of flaring actuator 16 and that houses the locking mechanism 18 and flaring mechanism 20. Locking mechanism 18 comprises a two-piece or multi-piece collet or collet assembly 30 that is movably received in a collar element or collet closer 32 (attached or retained at an outer end of housing 28 distal from flaring actuator 16) and that is moved relative to the collar element 32 via a lever or collet moving element 34 connected to rod 14b of locking actuator 14.

Figure 3:
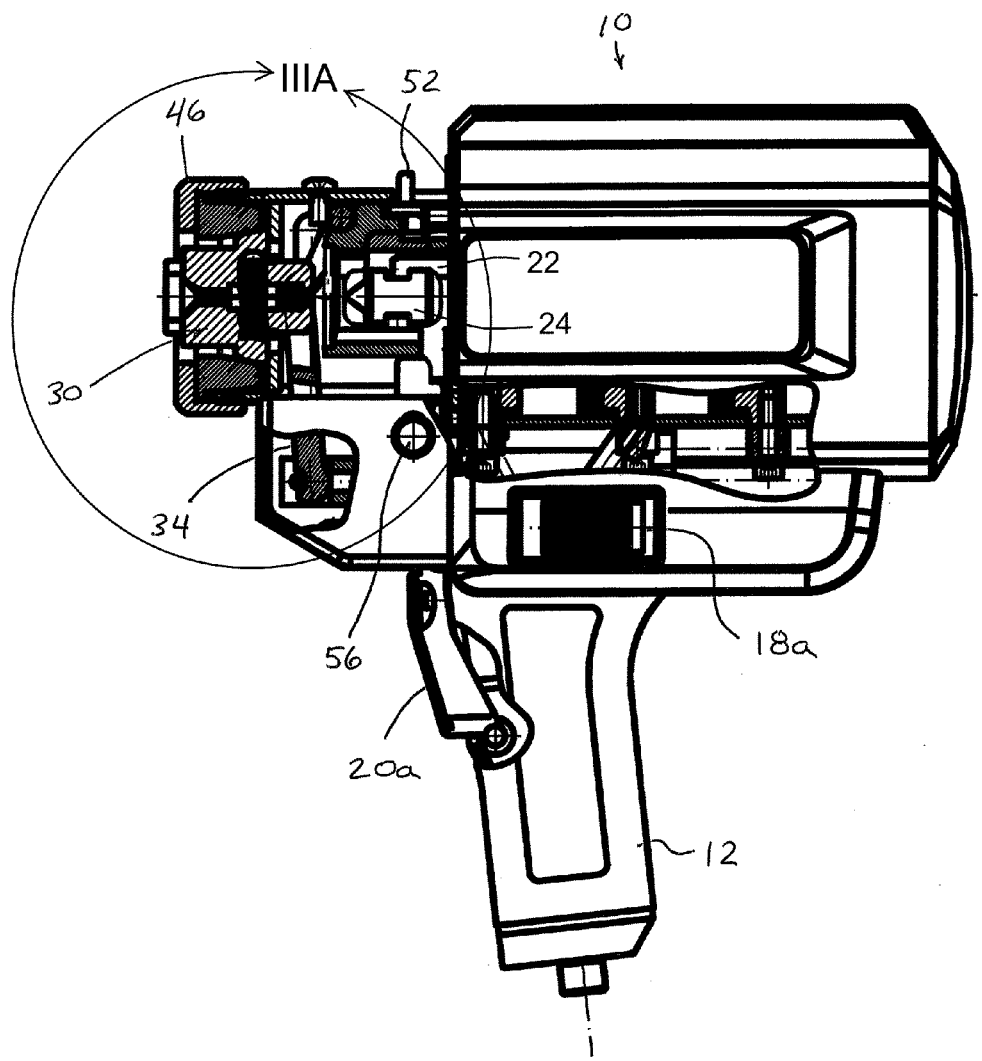
FIG. 3 is another side elevation and partial-sectional view of the flaring tool of the present invention, with portions removed to show additional details.
Figure 3A:
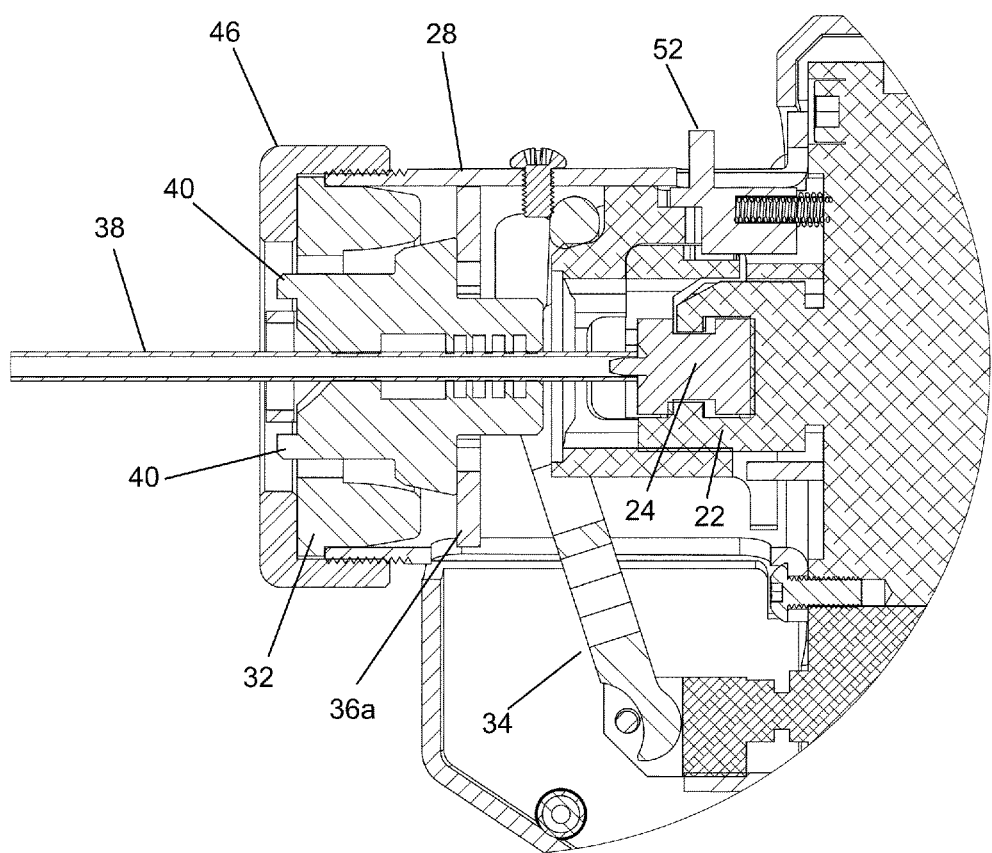
FIG. 3A is an enlarged sectional side elevation of the region designated at IIIA in FIG. 3.

As can be seen in FIGS. 3A and 6, collet moving element 34 is pivotally mounted at housing 28 and is pivoted via extension of retraction of rod 14b of locking actuator 14. Collet moving element 34 is pivotally attached at the housing 28 at one end and attached at the other end to rod 14b, and is configured to engage a ring or engaging element 36a of a base portion or frame or base 36 of the collet assembly or collet 30. Thus, as rod 14b is extended, the lever or collet moving element 34 pivots to be urged against the engaging element or ring 36a and to move ring 36a and base portion 36 and the entire collet assembly 30 relative to collar 32, which is fixedly retained relative to housing 28.

Figure 13:
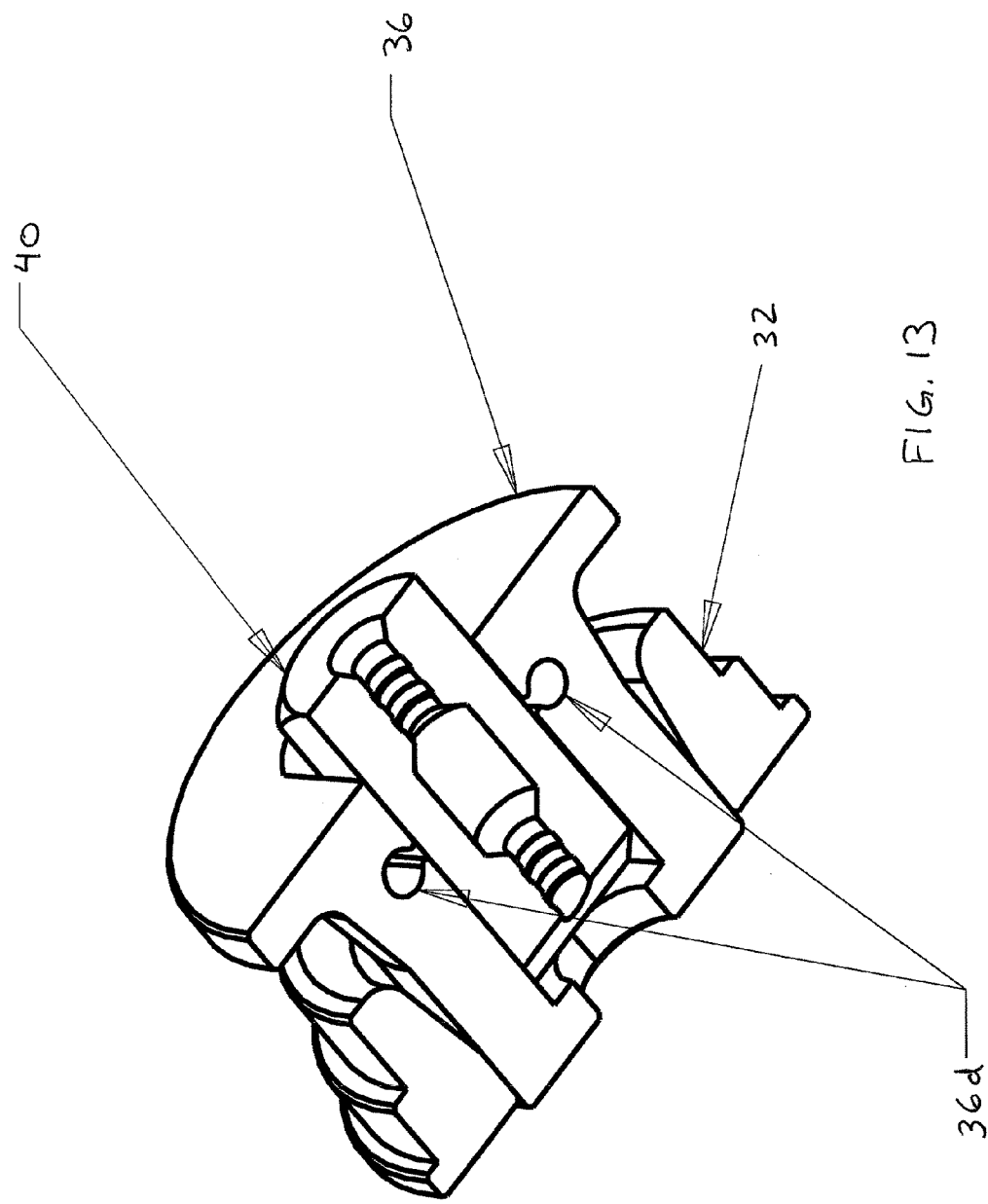
FIG. 13 is a perspective and partial sectional view of the collet of the flaring tool of the present invention.
Figure 14:
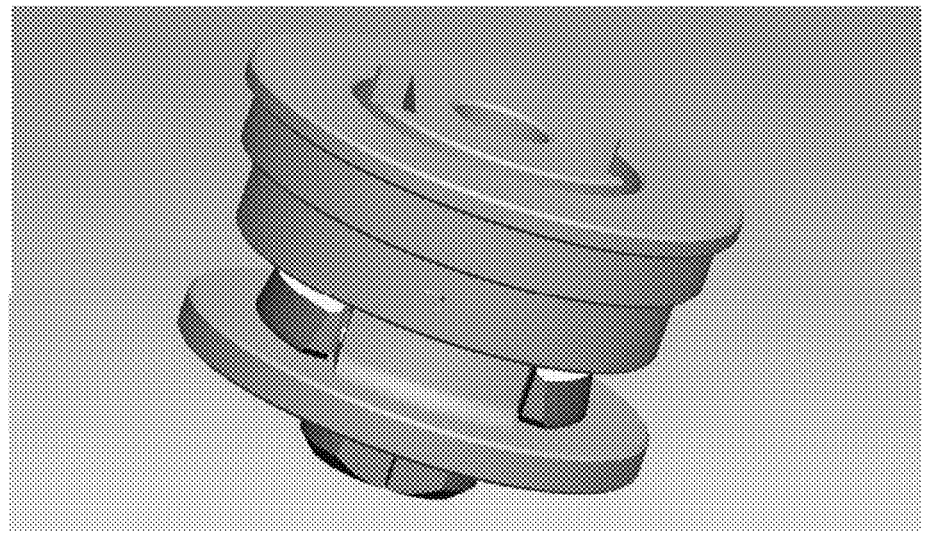
FIGS. 14-20 are images of the collet of the flaring tool of the present invention.
Figure 15:
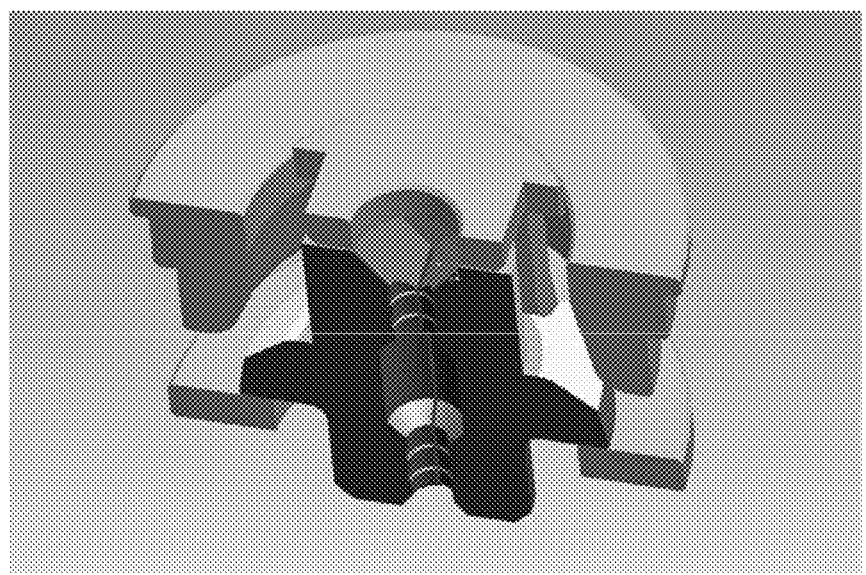
Figure 16:
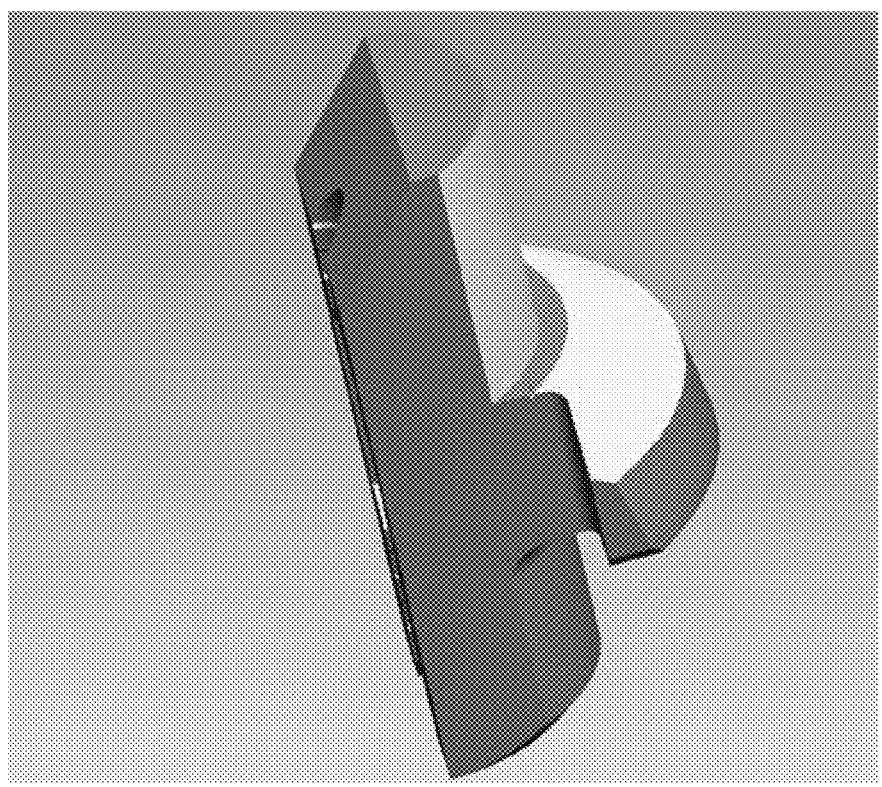
Figure 17:
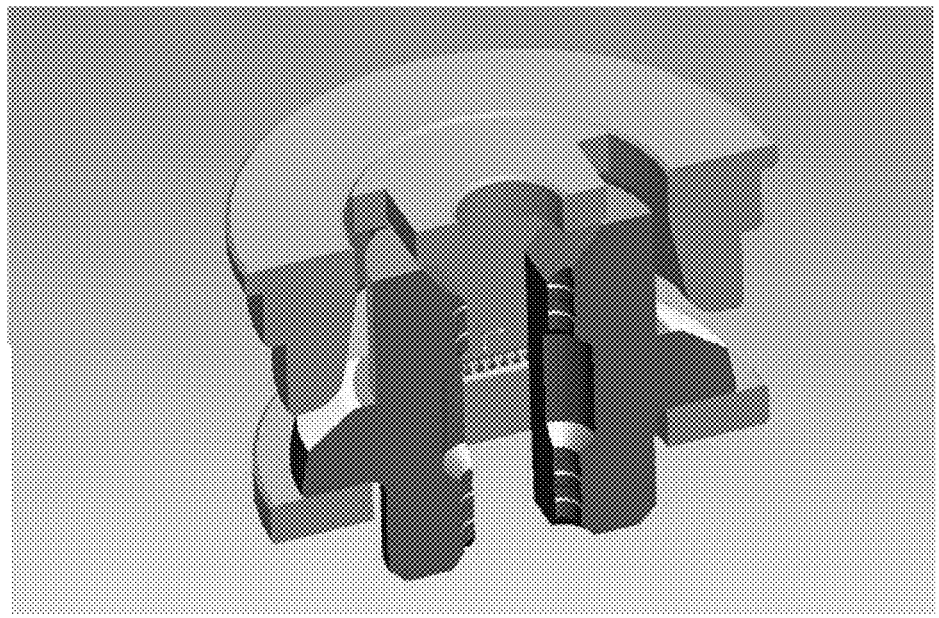

As shown in FIGS. 6 and 9-20, collet 30 comprises the base portion or frame or base 36, which supports two collet pieces or portions 40, which are biased or urged apart via biasing elements or springs 42. The base portion 36 includes the ring 36a and a collet guide portion 36b, which extends from ring 36a and movably receives and guides the collet pieces 40 thereat or therein. The biasing elements or springs 42 (such as coil springs or the like) are disposed between the collet guide portion 36b and the respective collet pieces or portions 40, and the ends of the springs may be received in recesses or apertures formed at the collet guide portion 36b (see holes 36d in FIG. 13) and collet portions 40. The partial cylindrical body portions 40a of collet pieces 40 are sized or formed or configured so that their outer ends fit within the outer end 36c of guide portion 36b of base 36, so that the collet assembly 40 comprises a unitary module that retains the collet pieces within the base portion so that the collet assembly may be readily removed from the flaring tool and replaced with a different sized collet assembly for flaring tubes of different diameters. The biasing elements 42 urge the collet portions 40 away from one another and away from the guide portion 36b of the base 36 of the collet assembly 30 to expand the opening or passageway between the collet portions 40 when they are in their open orientation or state, as discussed below.

The collet pieces or portions 40 are thus movably disposed at and partially in the collet base or frame 36 of the collet assembly and are configured to engage the collar 32 when the collet assembly 30 is moved towards a clamping position, whereby the collet portions 40 move radially inward to clamp onto a tube disposed therein. The collet pieces or portions 40 are movably disposed in the base or frame or body 36 and may move radially towards one another or away from one another and may pivot freely within the body 36. Because the springs 42 are closer towards the inner ends of the collet pieces, the collet pieces may pivot in the manner shown in FIG. 11 when allowed to fully separate or open. Because of the free or substantially unrestrained movement of the collet pieces in the collet body, the collet pieces can be substantially clamped onto a tube inserted therein and the collet pieces can be substantially opened to allow for a flared tube to be easily removed therefrom.

In the illustrated embodiment, the collet pieces comprise a generally partial cylindrical body portion 40a with a flange portion 40b that is disposed at and engages the ring 36a of base 36 to move the collet pieces with the ring but is movable along the surface of the ring as the collet pieces are urged radially inward by the collar 32. The outer portion of the flange portion 40b is formed or configured with a first angled or curved or rounded collar engaging surface or surface portion 40c that engages an angled or curved or rounded collet engaging surface 32a of collar 32 as the collet is moved into the collar or closer, whereby the interface between the surfaces 40c and 32a imparts a radially inward movement of the collet pieces 40 as the collet is moved into the collar, and the outer portion of the flange portion 40b includes a second angled or curved or rounded collar engaging surface or surface portion 40d that engages the angled or curved or rounded collet engaging surface 32a of collar 32 as the collet is moved further into the collar or closer, whereby the interface between the surfaces 40d and 32a imparts further radially inward movement of the collet pieces 40 to fully close the collet onto the tube disposed therein.

Thus, in the illustrated embodiment, the outer surface 40c of collet pieces 40 provides a ramped or curved shoulder or transition between the open state and the closed state of the collet, and eases insertion or movement of the collet into the collet closer when the locking mechanism is actuated, whereby the clamping of the collar onto the tube may be provided by the second, reduced angle or less aggressively angled surface 40d of the collet pieces. The angle of the ramp of the first surface 40c may be at least about 40 degrees relative to the longitudinal axis of the collet and less than about 55 degrees relative to the longitudinal axis of the collet, and preferably at least about 45 degrees relative to the longitudinal axis of the collet and less than about 50 degrees relative to the longitudinal axis of the collet, while the angle of the ramp of the second surface 40d may be at least about 8 degrees relative to the longitudinal axis of the collet and less than about 12 degrees relative to the longitudinal axis of the collet, and preferably at least about 9 degrees relative to the longitudinal axis of the collet and less than about 11 degrees relative to the longitudinal axis of the collet (such as, for example, about 9 to 10 degrees). The collet engaging surface 32a of the collar 32 may have a radius of curvature of between about 2 mm and 6 mm (and preferably between about 3 mm and 5 mm, such as, for example, about 4 mm) and the inner surface of the collar may be ramped or angled at an angle that is at least about 8 degrees relative to the longitudinal axis of the collet and less than about 12 degrees relative to the longitudinal axis of the collet, and preferably at least about 9 degrees relative to the longitudinal axis of the collet and preferably less than about 11 degrees relative to the longitudinal axis of the collet (such as, for example, about 9 to 10 degrees, and thus may be similar to the angle of the second outer surface 40d of the collet).

Figure 11:
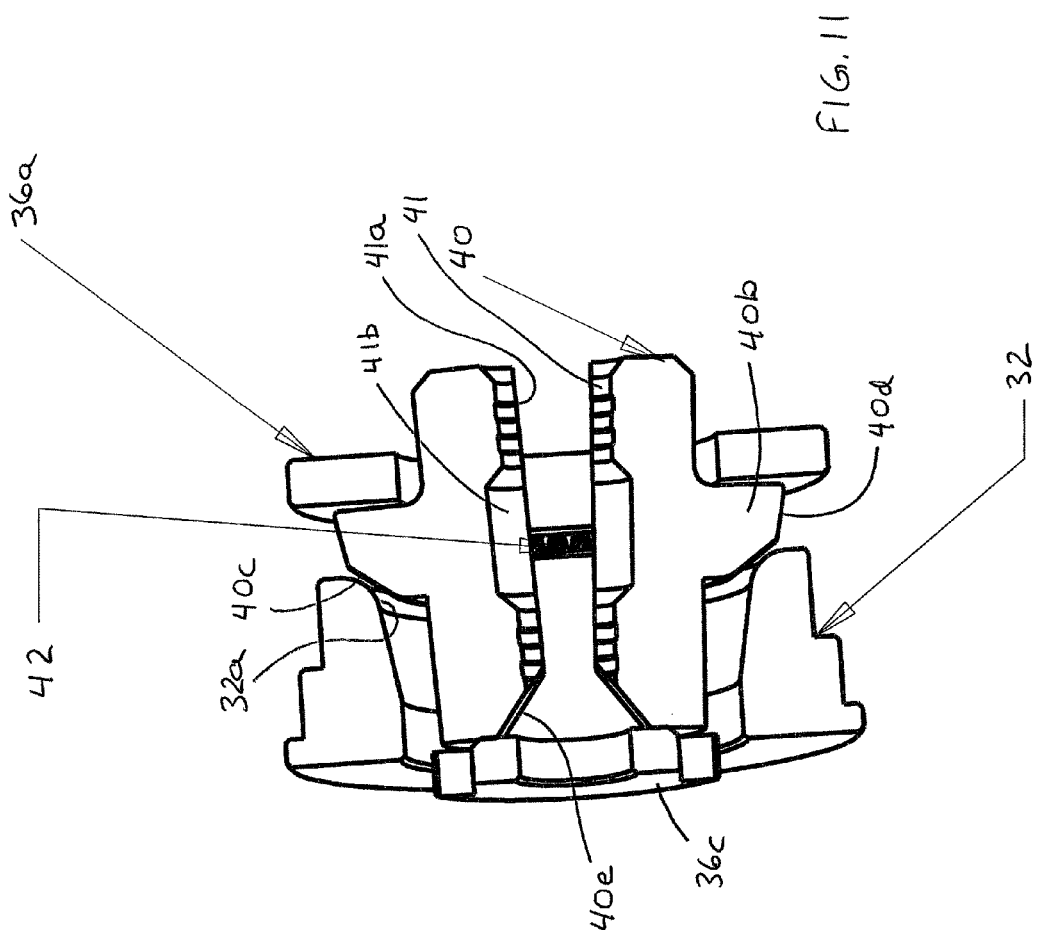
FIG. 11 is a sectional view of the collet of the flaring tool of the present invention, shown with the collet opened to receive or discharge a tube.
Figure 12:
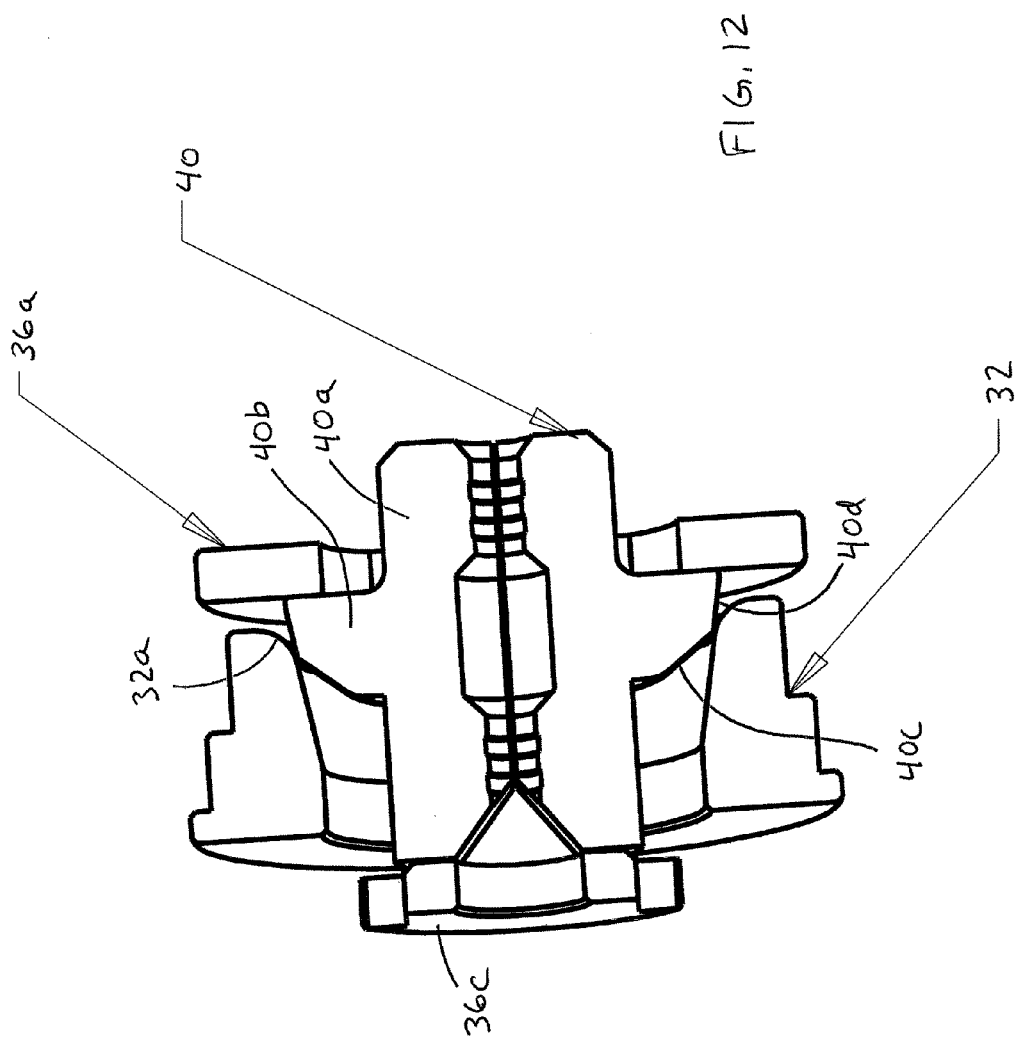
FIG. 12 is a sectional view of the collet of the flaring tool of the present invention, shown with the collet closed for clamping onto a tube.

Each collet piece 40 also includes a generally concave or recessed inner surface, such as a partial cylindrical inner surface 41, which includes ribs 41a and a larger diameter portion 41b. The ribs and larger diameter portion provide a plurality of edges or ridges to enhance gripping of the tube disposed therein when the collet pieces are moved so as to clamp onto the tube. As can be seen with reference to FIG. 16, the outer ends 40e of the partial cylindrical body portions 40a of collet pieces 40 are angled or ramped or chamfered to allow for larger tubes to pass through the collet after flaring. This is because, when the collet is disengaged from the collar and the collet pieces are opened, the collet pieces may be angled within the base (such as shown in FIGS. 3A and 11), whereby the outer ends of the body portions of the collet pieces are closer to one another than other portions of the collet pieces.

Thus, each piece 40 of the collet assembly 30 is movable relative to the other between an expanded or non-locking orientation and a collapsed or locking orientation, where the collet pieces (with curved or arcuate inner surfaces 41 corresponding to the curvature of the outer surface of the tube 38 (FIG. 10) for the given or selected size of the tube that is being flared by the flaring tool) engage and clamp against the outer surface of the tube or pipe 38. Optionally, an end cap 46 may be removable from housing 28 to facilitate changing of the collet assembly 30 (and optionally of the collar 32 as well) to provide a desired radius of curvature of the inner surfaces 41 of the collet for the selected tube that is being flared by the flaring tool. The end cap may be threaded onto the end of the housing to allow a user to remove the collet to replace the collet with a different size collet for flaring different diameter tubes (with the inner tube engaging surfaces of the different collets having a different radius of curvature for a selected or different diameter tube or pipe).

Figure 18:
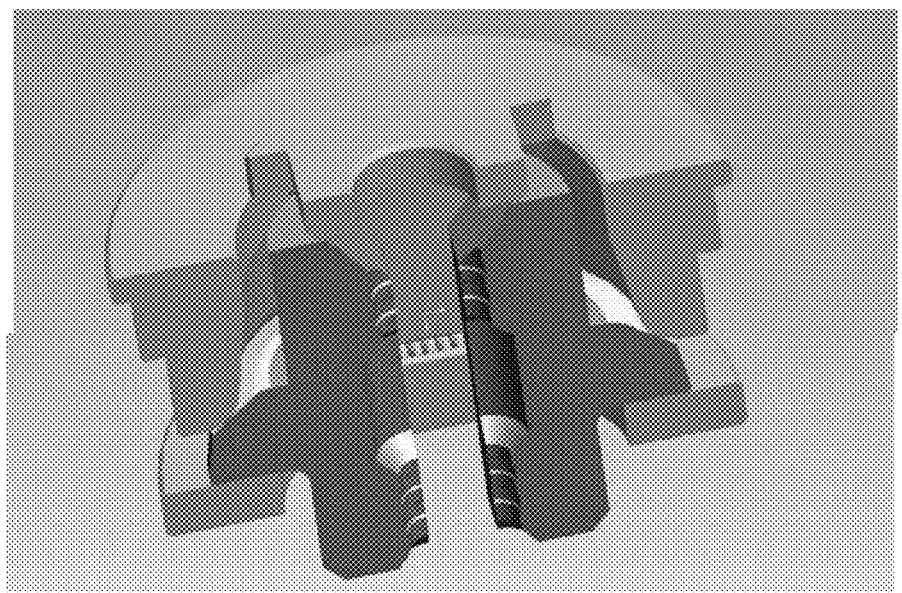
Figure 19:
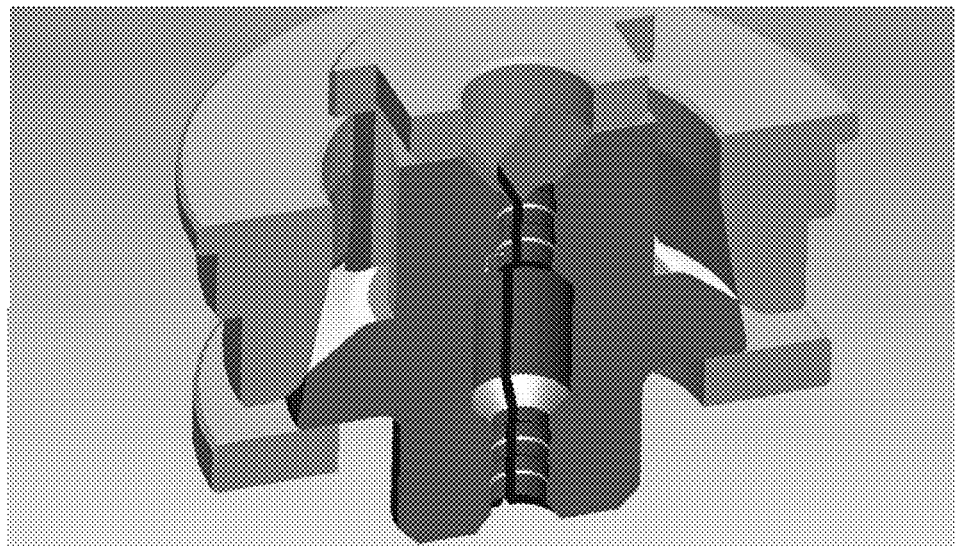
Figure 20:
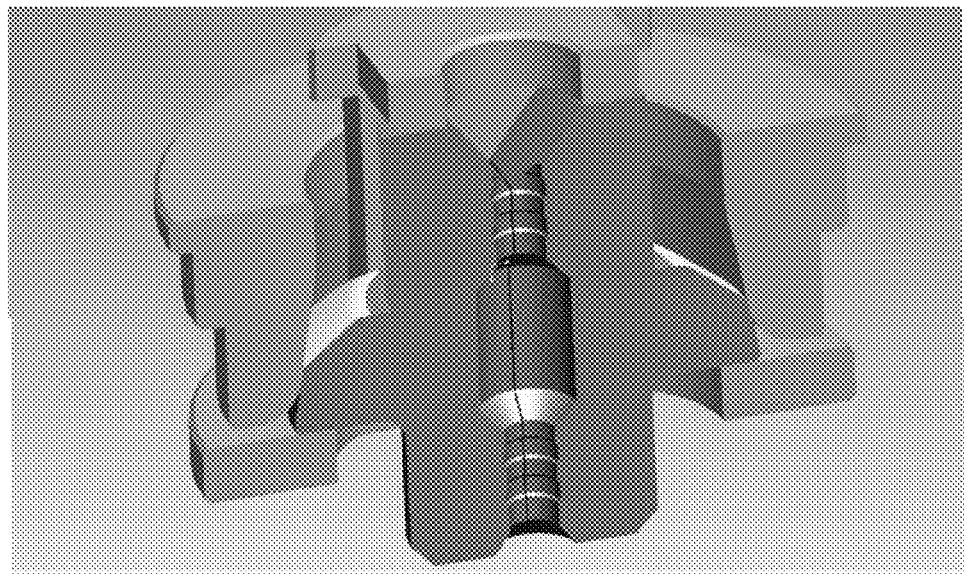
Figure 21:
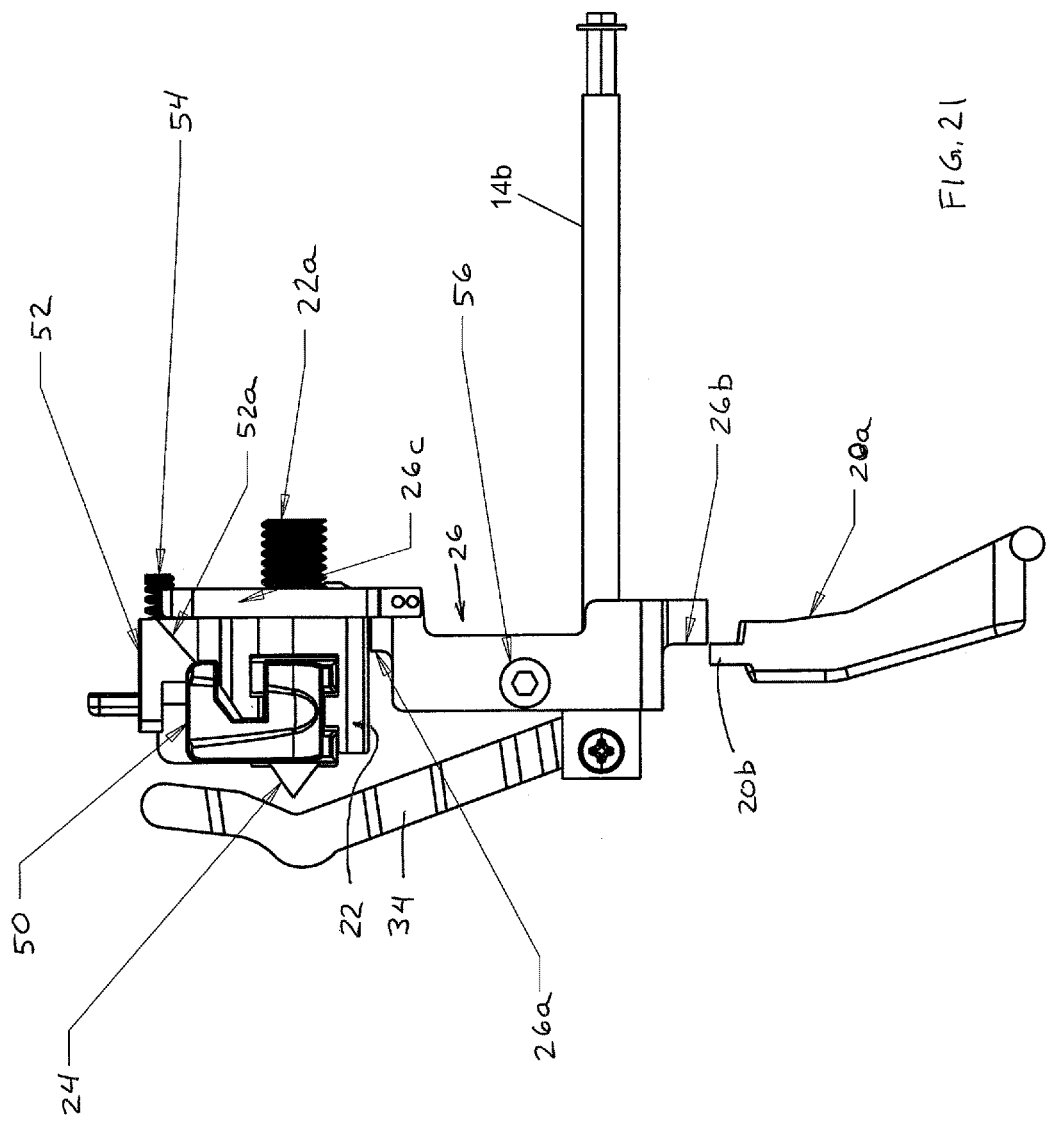
FIG. 21 is a side elevation of the trigger interlock/stop system of the flaring tool of the present invention.

Thus, and as best seen with reference to FIGS. 17-20, when the collet assembly is fully opened and with the curved surfaces of the collet pieces not engaged with the curved or ramped surface of the collar (FIG. 17), the collet pieces are substantially separated to provide a larger diameter passageway for receiving the tube therein. During closing of the collet (FIG. 18), the collet holder is pushed into the collar or collet closer, which forces the wedge portion or curved surfaces of the collet pieces into engagement with the collet closer ramp, thus beginning to close the collet. As shown in FIG. 18, the collet is about 50 percent down the tapered surface. The tapered surface reduces or limits abrupt engagement of the collet with the collar when the collet is moved into the closer or collar. As the collet is further closed (FIG. 19), the collet flanges are substantially received in the collar or closer and the collet pieces are substantially closed. As shown in FIG. 19, at this transition phase the tapered surface of the collet pieces has moved past the closer surface, so that the closer surface engages the second tapered surface at the outer surface of the flange of the collet pieces. Once the collet travels completely into the closer or collar, the outer tapered surface will force it completely closed (FIG. 20). As shown in FIG. 20, the outer surface of the collet taper is in the closer and the collet is completely closed. When the collet is fully closed in this manner, there will be an interference fit with the tube disposed therein, such as, for example, at least about a 0.001 inch interference fit and more preferably at least about a 0.002 inch interference fit.

The collet and collar constructions allow the smaller diameter conical surface portion 32a of collar 32 to engage and slide along the conical shaped or ramped portion 40c, 40d of collet pieces 40 as collet 30 is urged into and along collar 32 by actuating lever 34 and ring 36a, thereby urging collet 30 to its collapsed or clamping state. When the locking mechanism is retracted, collet 30 is urged along the collar in the opposite direction and, when the ramped or curved outer surface 40c clears the ramped or curved or conical inner surface 32a of collar 32, the collet is free to expand to its non-compressed or non-clamping state. The collar 32 is generally fixed relative to housing 28 and may engage the inner surface or wall of housing 28 and the end cap 46 when the end cap 46 is threaded onto or otherwise attached at the end of the housing 28, while the collet 30 may be moved relative to the collar to collapse the collet and clamp onto an inserted tube or to allow the collet to expand to release a tube or to be configured to receive a tube. Optionally, the collar and collet may be reversed, such that the collar may be moved (via actuation of the locking actuator and movement of the lever arm) onto and around the collet to clamp the collet onto the tube via movement of the lever or arm 34. However, the illustrated configuration is preferred because if the tube tends to move during the flaring process (responsive to the forces exerted at its held end), the movement of the tube would be in a direction that would urge the collet further into the collar and thus would increase the clamping force onto the tube by the collet, thereby further limiting or substantially precluding such tube movement. Optionally, the inner surfaces of the collet pieces may include a roughened or knurled portion to further enhance gripping of the tube to further limit or substantially preclude movement of the tube within the collet when the collet is clamped onto the tube.

Figure 23:
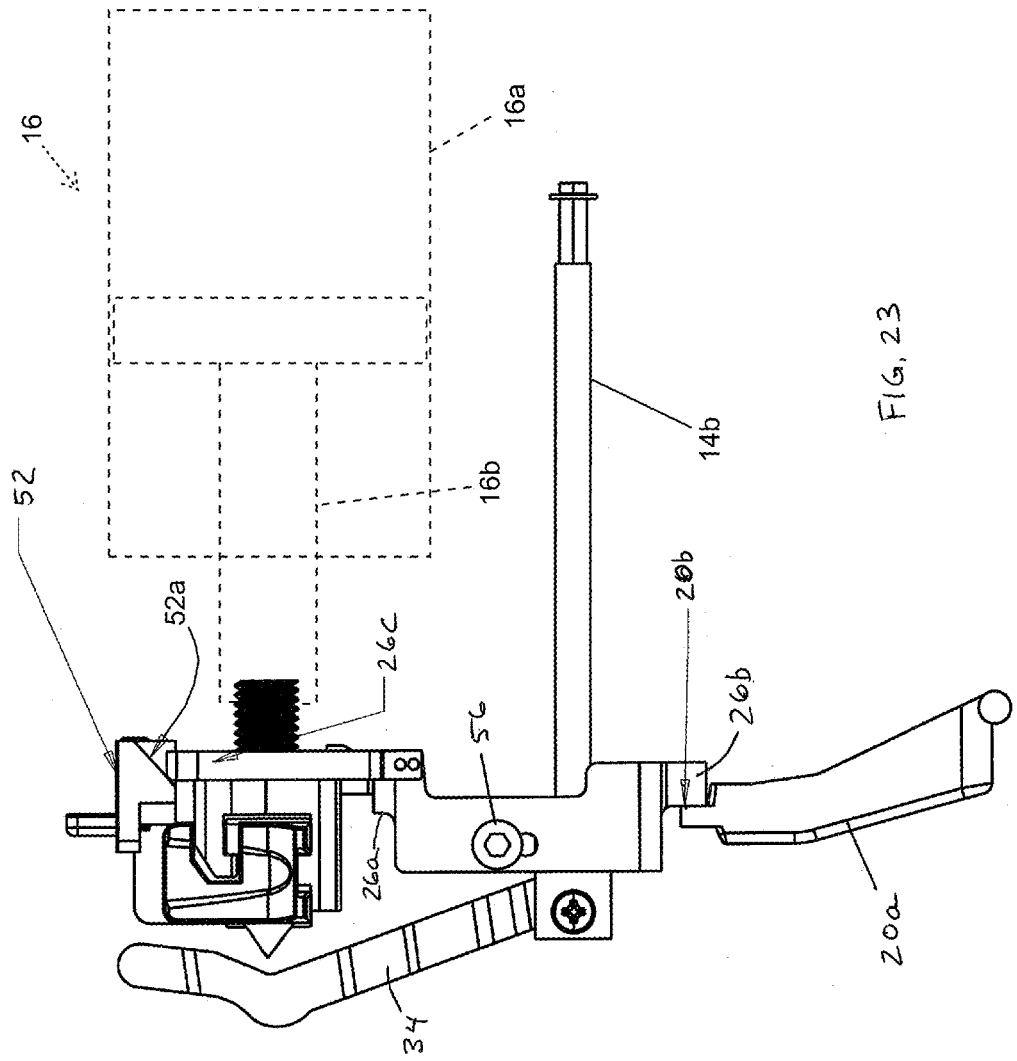
FIG. 23 is another side elevation of the trigger interlock/stop system of FIG. 21, shown with the interlock engaged.

Flaring mechanism 20 of flaring tool 10 includes the mandrel holder 22, which is attached to a movable or extendable and retractable rod or ram 16b of flaring actuator 16, which may comprise a pneumatic or hydraulic actuator or cylinder 16a that, responsive to a pressurized air of fluid input, extends and retracts the rod 16b to move the mandrel holder 22 (and mandrel 24 disposed thereat) between its retracted position and its extended or flaring position (FIG. 23). The mandrel holder 22 may include an attachment portion 22a that is configured to attach at the end of the rod 16b (and may be threaded onto the end of the rod 16b or may otherwise attach at the end of the rod 16b) such that longitudinal movement of the rod (responsive to pressurized air or fluid at the cylinder 16a) moves the mandrel holder 22 and mandrel 24 along and within the housing 28.

Figure 8:
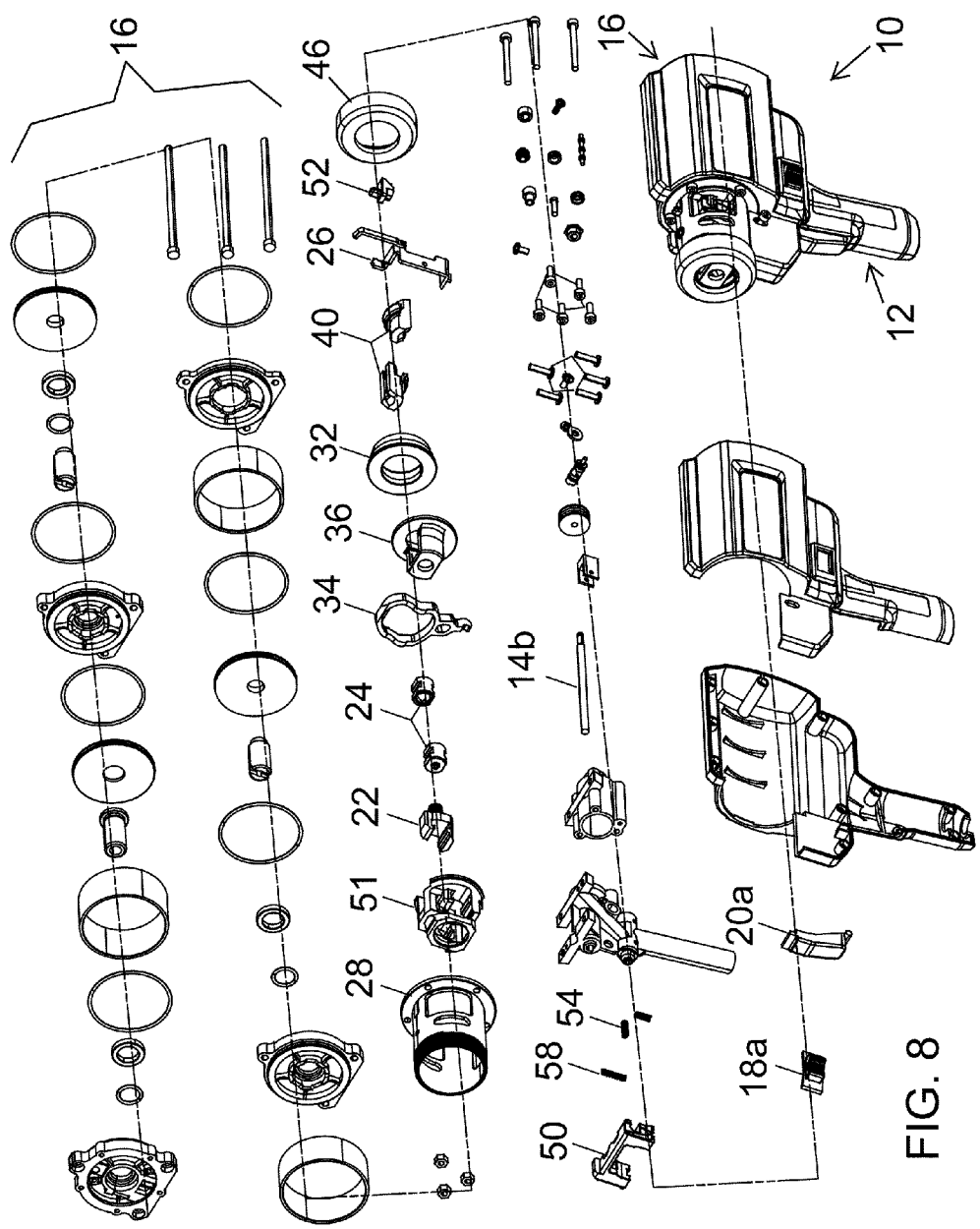
FIG. 8 is an exploded perspective view of the flaring tool of the present invention.
Figure 9:
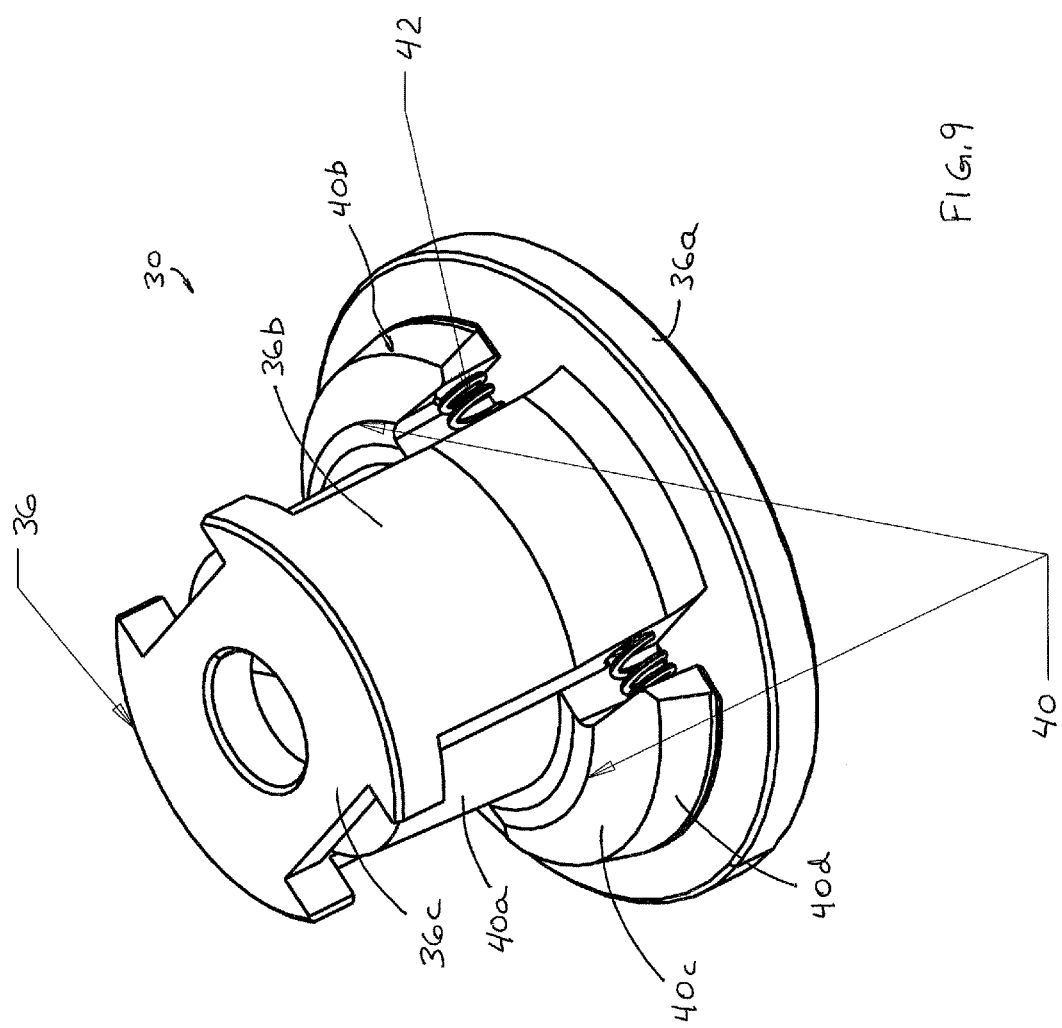
FIG. 9 is an enlarged perspective view of the collet of the flaring tool of the present invention.
Figure 10:
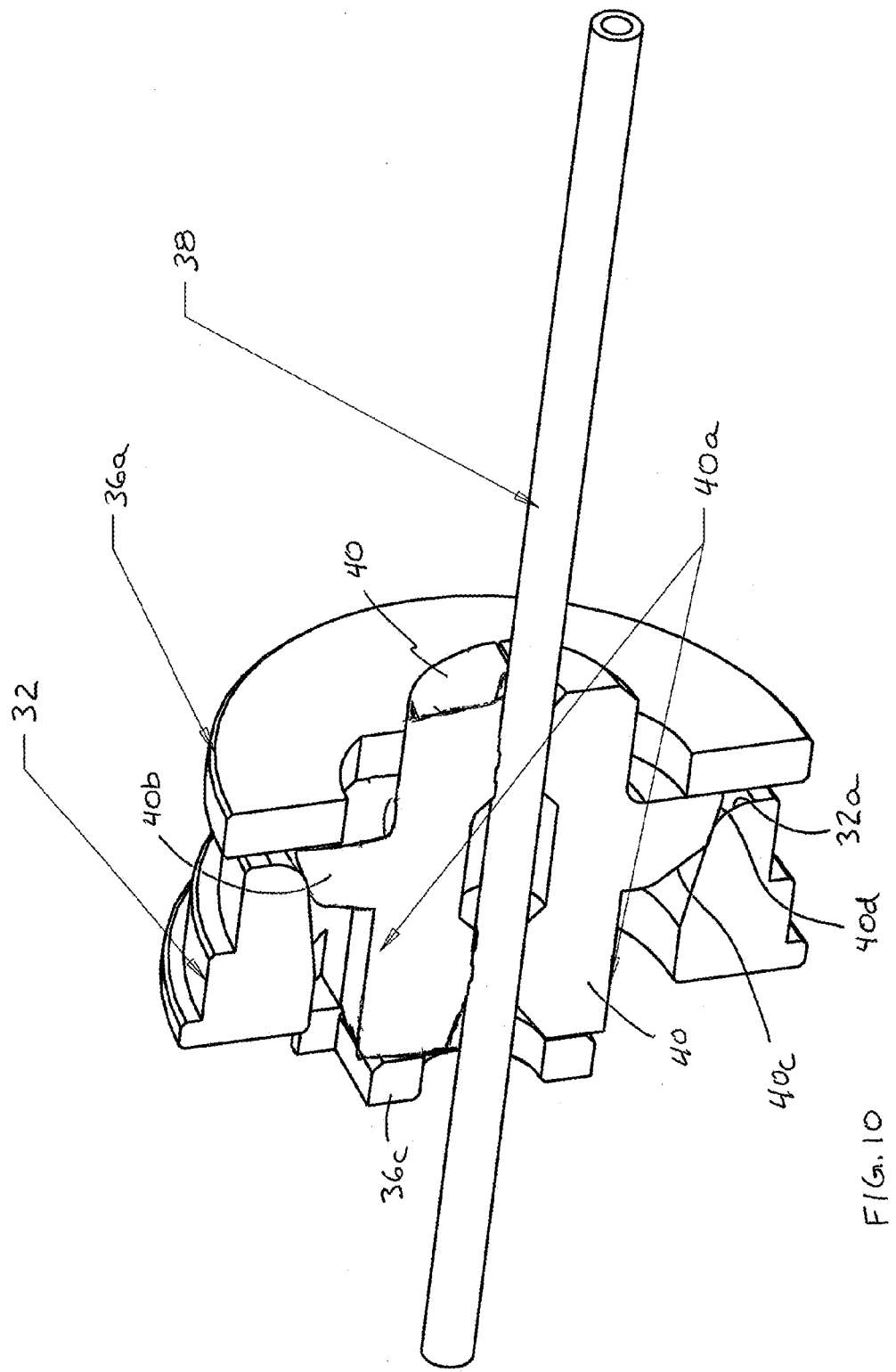
FIG. 10 is a perspective and partial sectional view of the collet with a tube received therein.
Figure 26:
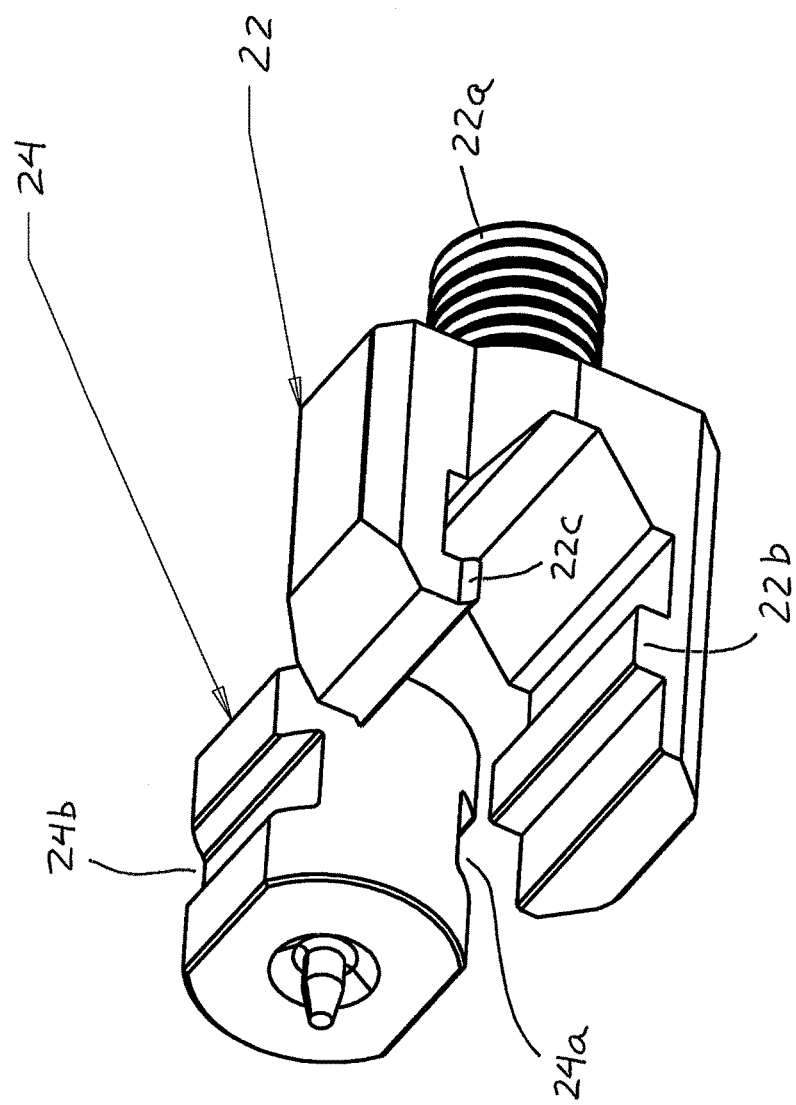
FIG. 26 is a perspective view of a mandrel and the mandrel holder of the flaring tool of the present invention.
Figure 28A:
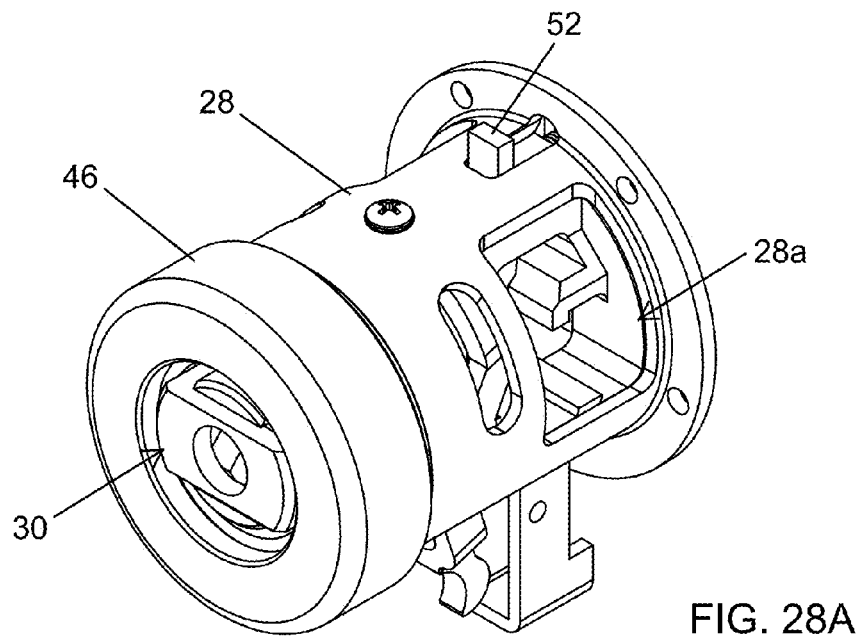
FIG. 28A is a front perspective view of a locking and flaring head of the flaring tool.
Figure 31:
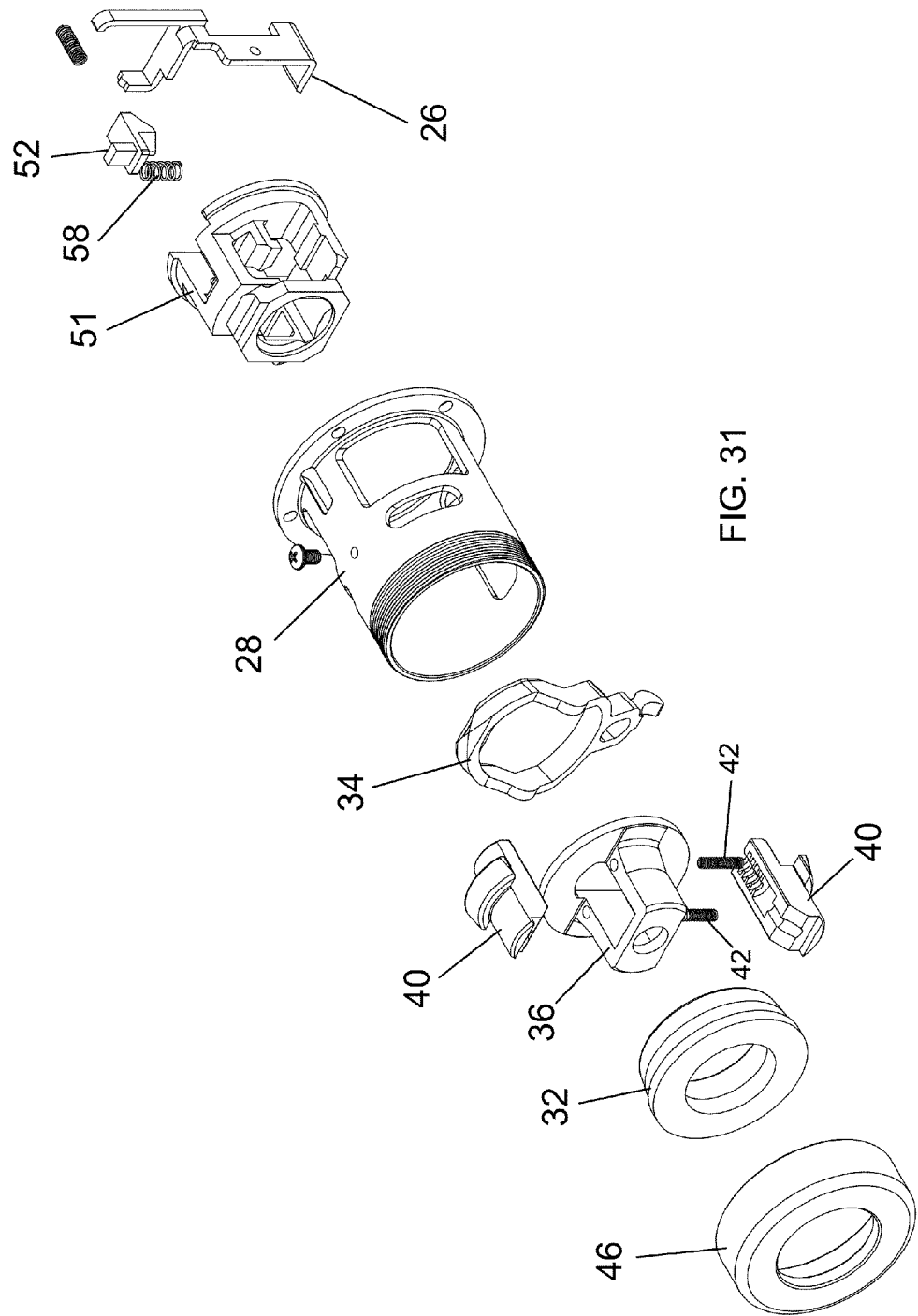
FIG. 31 is an exploded perspective view of the locking and flaring head.

In the illustrated embodiment, the flaring tool 10 includes a mandrel slide 50, which is configured to hold or support two mandrels 24 (such as a bubble flaring mandrel and a conical flaring mandrel or such as two different sized mandrels or the like) and which is configured to be selectively moved across a mandrel slide mount 51 (FIGS. 6 and 8) of the flaring tool to selectively position a selected mandrel at the mandrel holder 22. As best shown in FIGS. 24 and 25, mandrel slide 50 is configured to support two mandrels 24 therein (and the mandrels may be double ended mandrels where they may be reversible such that four different flaring options are available with the two mandrels of the mandrel slide) and is slidable across the tool to selectively position one of the mandrels at the mandrel holder. The mandrel slide 50 includes a receiving portion 50a, which is configured to support or house the mandrels 24, and includes a channel 50b formed along a lower portion of the slide, with the channel 50b corresponding to channels 24a formed along the lower portion of the mandrels 24, whereby the channels of the slide 50 and mandrels 24 receive a lower tab or rail 22b of the mandrel holder to move the slide and mandrels across the mandrel holder. As shown in FIG. 26, the mandrels 24 also include an upper channel 24b that is configured to receive an upper tab or rail 22c of the mandrel holder 22. The upper tab 22c of the mandrel holder 22 is received below the body portion 50c of the mandrel slide 50, such that, when a selected mandrel is aligned with the mandrel holder, the upper and lower rails 22c, 22b of the mandrel holder are received in the channels 24b, 24a of the mandrel 24, whereby the mandrel holder, when moved via the actuator, moves the mandrel out of the mandrel slide 50 (since the mandrel at the mandrel holder is not engaged with the rails of the mandrel slide). The mandrel slide mount 51 of the flaring tool includes one or more lower rails or tabs, such as shown in FIGS. 28A and 31, that are disposed at either side of and aligned with the lower rail or tab 22b of the mandrel holder 22 when the mandrel holder is retracted, so that the slide 50 and mandrels 24 may move back and forth across the tool to selectively position a mandrel 24 at the mandrel holder 22.

In order to allow for movement of the mandrel slide 50 and for locking of the mandrel slide when a mandrel is at the mandrel holder, a locking tab 52 is movably disposed at the flaring tool and is movable to engage one of two detents or notches or recesses 50d at the mandrel slide body 50c, such as shown in FIGS. 24 and 25. The locking tab 52 may be biased or spring-loaded (such as via a spring or biasing element 54) towards engagement with the notch or recess 50d, whereby a user may move the locking tab out of the notch or recess 50d, slide the mandrel slide to position a selected mandrel at the mandrel holder 22, and release the locking tab 52, whereby it is urged into engagement with the notch or recess to hold the mandrel slide 50 and the selected mandrel 24 at the mandrel holder, whereby actuation of the actuator 16 moves the mandrel holder 22 and selected mandrel 24 to flare the tube that is locked at the collet.

Figure 27A:
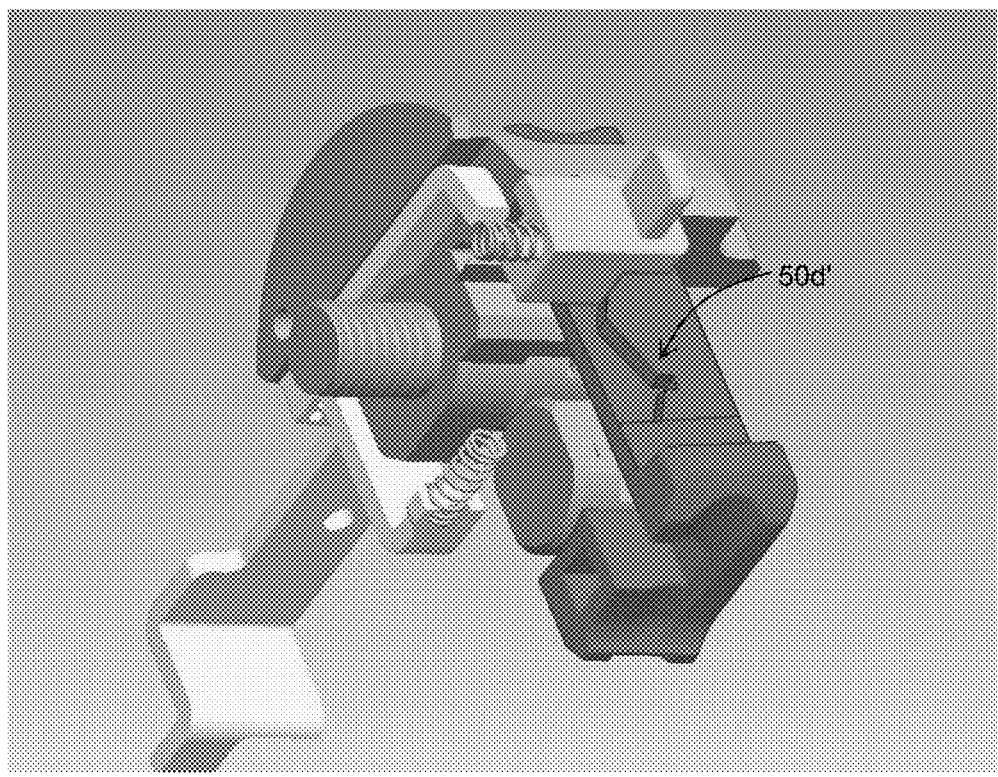
FIG. 27A is a rear perspective view of a mandrel mounting assembly of the flaring tool.

Although shown as two separate, generally rectangular recesses for receiving a corresponding portion of the locking tab, the recesses 50d' (FIGS. 27A and 27B) may be generally triangular shaped to receive a correspondingly shaped portion of the locking tab. In such a configuration, if the locking tab is released when the mandrel slide body is between the two use positions, the angled recesses and locking tab surfaces will guide the locking tab into one of the two recesses and will urge the mandrel slide body into one of the two use positions, thereby limiting the chance that the mandrel slide body will be retained at a position between the two use positions (where one of the mandrels is in position for use). In the illustrated embodiment of FIGS. 27A and 27B, recesses 50d' include respective squared-off central portions configured to receive a corresponding squared-off projection at the tip of the locking tab, to provide a positive detent when the locking tab is fully engaged, which limits or prevents the mandrel slide from moving due to a lateral force applied to the mandrel slide without the locking tab being moved to its releasing position.

As shown in FIGS. 1-2, housing 28 has a side opening or window 28a, which is generally aligned with mandrel slide 50, and which allows a user to selectively move the mandrel slide and mandrels held thereat relative to the mandrel holder 22 and mandrel slide mount 51, so as to align a selected mandrel with the mandrel holder to select the desired or appropriate flaring function, such as for replacing the mandrel with a new mandrel or a different size or shape mandrel or the like. Thus, between flaring operations, a user may readily change the mandrel without having to disassemble the flaring tool.

When the flaring tool is operated, the user input 20a and actuator 16 may be initially actuated to move or extend the rod 16b of flaring actuator 16 (along with the mandrel holder and selected mandrel). After the rod has been extended a sufficient amount, the stop element 26 is moved so that a stop surface or portion 26a is moved into position behind the mandrel holder 22, whereby the user input 20a may be released and the stop element 26 limits or substantially precludes full retraction of the mandrel holder and mandrel. When in this locked or stopped position, the mandrel is positioned at a location for setting the insertion depth of the tube. The operator thus inserts the tube into the collet and through the collet until the end of the tube engages the mandrel. At that point, the tube is properly positioned for flaring, so the operator may then actuate the locking mechanism to lock the tube at the collet, such as described above.

Figure 28B:
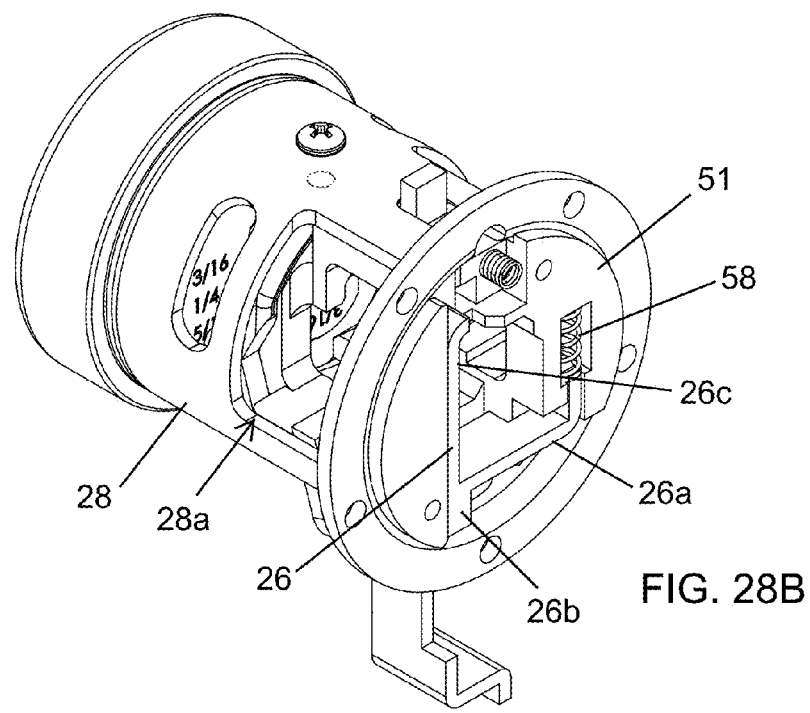
FIG. 28B is rear perspective view of the locking and flaring head of FIG. 28B.
Figure 29:
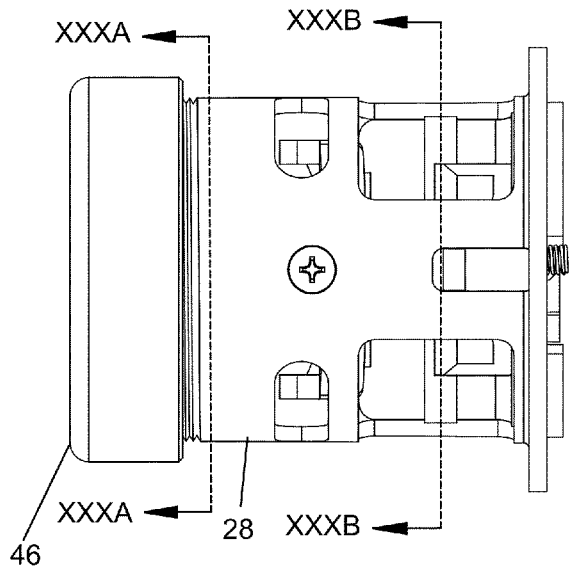
FIG. 29 is a top plan view of the locking and flaring head of FIGS. 28A and 28B.
Figures 30A, 30B:
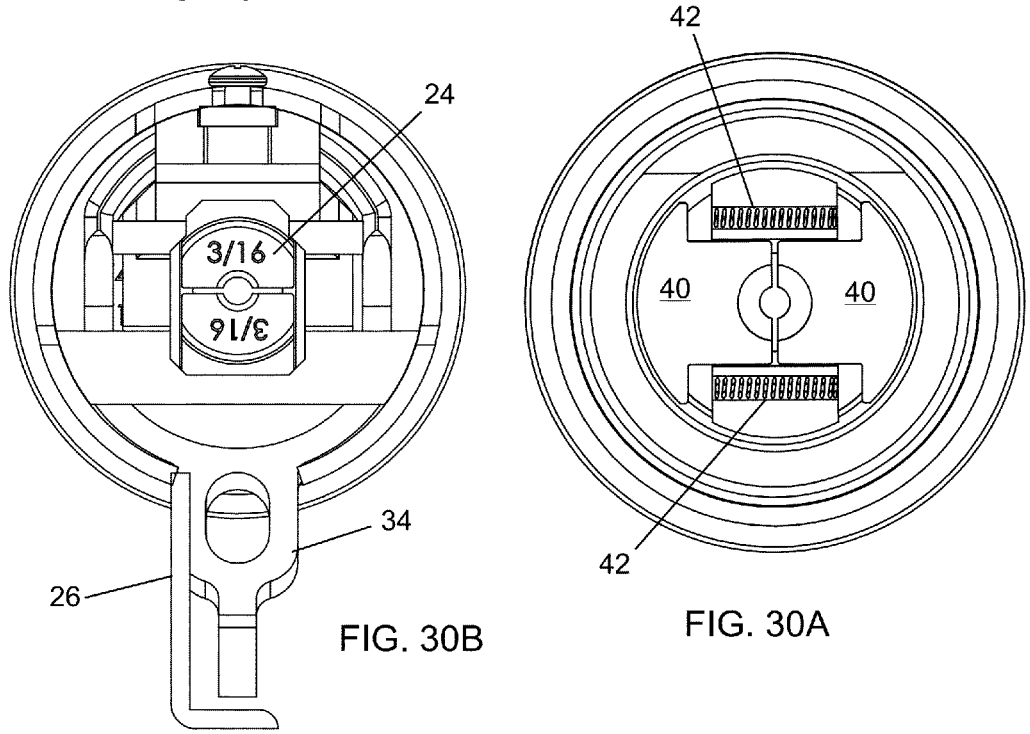
FIG. 30A a sectional elevation of the locking and flaring head, taken along line XXXA-XXXA in FIG. 29.
FIG. 30B is a sectional elevation of the locking and flaring head, taken along line XXXB-XXXB in FIG. 29.

In the illustrated embodiment, and such as shown in FIGS. 4, 6 and 21-23, stop element 26 is movably mounted at the flaring tool and is generally vertically movable via a tab or knob or handle or lever 56, which the user may grasp at the outside of the tool housing 28. When the stop element 26 is moved upward, the mandrel holder stop surface 26a is moved into position behind the mandrel holder 22 (FIG. 22) to engage a stop surface or rear surface 22d of the mandrel holder 22 to limit retraction of the mandrel holder when the flaring actuator is deactivated. When stop element 26 is not manually urged into position behind mandrel holder 22, or held in position by mandrel holder 22, stop element 26 is biased downwardly by a spring 58 that is held in compression at a distal end of the mandrel holder stop surface 26a, such as shown in FIGS. 5 and 28B, thereby biasing stop surface 26a away from mandrel holder 22.

Figure 22:
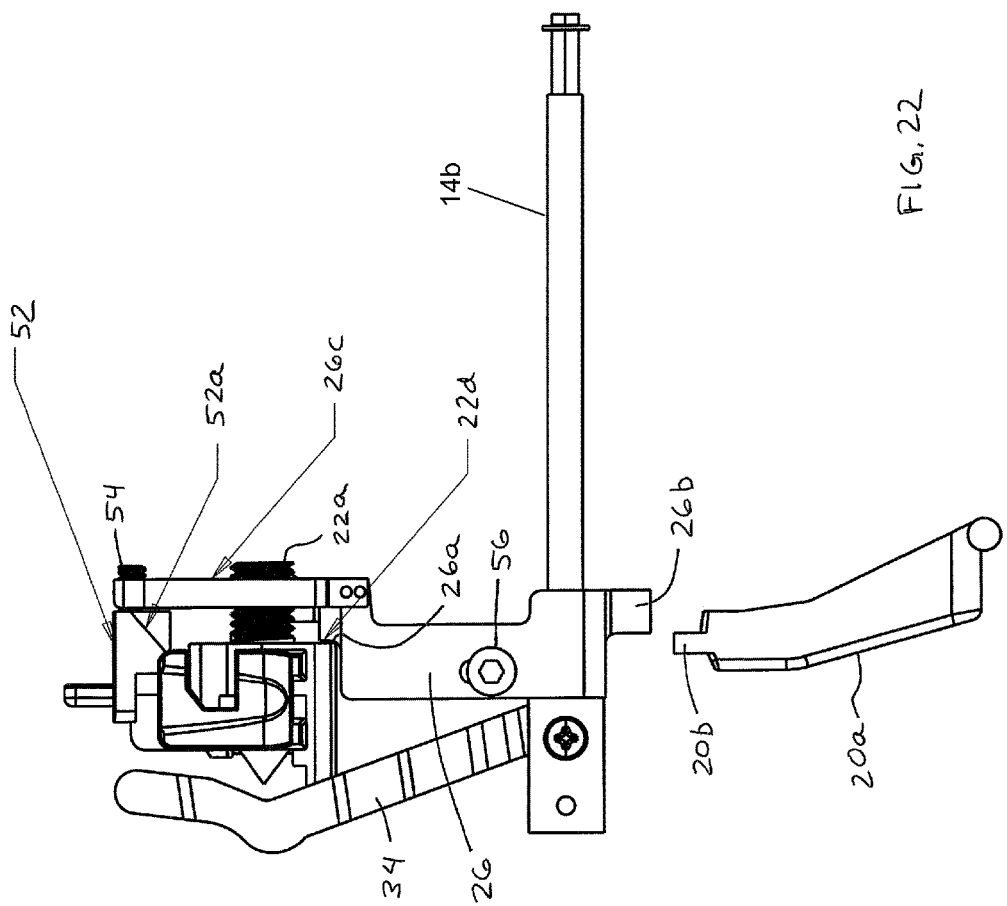
FIG. 22 is another side elevation of the trigger interlock/stop system of FIG. 21, shown with the stop engaged or set with the mandrel holder.

In the illustrated embodiment, the stop element 26 includes a trigger interlock tab 26b and an interlock portion 26c that limits actuation of the user input 20a when the mandrel is not properly disposed at or aligned with the mandrel holder 22. The interlock portion 26c is engagable with a ramped surface 52a of the locking tab 52 and limits or precludes actuation of the user input 20a and actuator 16 (via the trigger interlock tab 26b engaging a tab 20b of user input 20a) when the locking tab 52 is not fully seated in a recess or detent of the mandrel slide (and thus only allows for actuation when a selected mandrel is properly positioned and aligned at the mandrel holder). For example, and as can be seen with reference to FIGS. 21-23, when the locking tab 52 is fully forward and into a detent or recess (FIGS. 21 and 22), the actuator 16 may be actuated to move the mandrel holder 22 from its fully retracted state (FIG. 21) to a partially extended state (FIG. 22). When in the partially extended state, the stop element 26 may be moved or raised to position the stop surface 26a at the stop surface 22d of the mandrel holder 22 to limit retraction of the mandrel holder when the actuator is deactivated. However, if the locking tab 52 is not fully seated in a recess or detent of the mandrel slide (FIG. 23), the stop element 26 is lowered so that the interlock tab 26b engages tab 20b of the user input 20a to limit or substantially preclude actuation of the user input 20a and actuator 16 by a user of the flaring tool. Thus, when the slide locking tab or element 52 is not located in one of the two notches 50d of the mandrel slide 50, the locking tab causes a movement in the stop or trigger interlock 26b, which then prevents the trigger or user input 20a from being actuated or depressed by the user. This prevents tool activation when the slide and mandrel are not in proper alignment with the mandrel holder. The detents and locking tab also provide a positive center location for the selected mandrel at the mandrel holder.

Thus, a user of flaring tool 10 may hold flaring tool 10 at handle portion 12 and may move the mandrel slide 50 to position a selected mandrel 24 at the mandrel holder 22, whereby the locking tab 52 moves into the detent to secure the mandrel slide 50 at that location and to allow the trigger interlock 26b to raise up to allow for actuation of the user input 20a. The user may then actuate the user input 20a and actuator 16 to extend or move the mandrel holder and selected mandrel an initial amount, whereby the user may move the stop/interlock element 26b up (against the biasing force of spring 58) to position the stop surface 26a behind the mandrel holder 22 and to thus limit retraction of the mandrel holder so that the mandrel holder cannot return to its fully-retracted rest position. At this location, the mandrel 24 is in position to set the insertion depth of the tube or pipe 38 that is to be flared. The operator then may insert a tube 38 into the collet 30 and the tube will contact the face of the selected (and partially extended) mandrel 24 to set the correct insertion depth of the tube 38.

When the tube is so inserted (and is set to the desired position for flaring), the user may actuate the locking actuator 14 (such as via pressing or actuating user input 18a) to cause locking actuator 14 to extend rod 14b (responsive to pressurized air or fluid at cylinder 14a) to pivot lever 34 to move ring 36a and collet 30 relative to collar 46 and housing 28 to cause collet 30 to collapse and clamp onto the tube to securely retain the tube in collet 30 and housing 28 (with the end of the tube being at the desired or appropriate location for flaring). The user input 18a may comprise a sliding and locking switch that may lock in the actuated position so that the actuator maintains the collet 30 in its clamping or collapsed state throughout the flaring process.

After the tube is secured at the flaring tool 10, the user may actuate the flaring mechanism 20 (such as via pressing or actuating user input 20a) to cause flaring actuator 16 to extend rod 16b (responsive to pressurized air or fluid at cylinder 16a) to move mandrel holder 22 and mandrel 24 towards and into further engagement with the end of the tube 38 to flare the end of the tube.

After the flaring process is completed, the user may release the flaring user input 20a (or actuate a second user input or the like) to allow the mandrel holder 22 and mandrel 24 to retract so that mandrel 24 is located at the mandrel slide 50 at or near window 28a of housing 28. The user may then move the mandrel slide 50 to move the mandrel 24 from mandrel holder 22 and to move a second selected mandrel 24 into position at the mandrel holder 22, so that another flaring end is disposed at the mandrel holder for engaging the tube end. The user may once again set the insertion depth and flare the tube end with the second selected mandrel by repeating the process above. When the second flaring process is completed, the user input 20a may be released (or another user input may be actuated) and the mandrel holder 22 and mandrel 24 are retracted, so that mandrel 24 is fully seated in mandrel slide 50, which is once again made slidable in mandrel slide mount 51 upon release of locking tab 52.

After the flaring process is complete, the locking mechanism 18 may then be released to allow for removal of the tube from the collet 30 (with the collet 30 being allowed to substantially expand when its flanges 40b of the collet pieces 40 are moved to be outside of the collar 32 to provide internal clearance within the collet for removal of the flared end of the tube.

The locking actuator 14 may comprise any suitable actuator, such as any suitable linear actuator or the like, without affecting the scope of the present invention. For example, the locking actuator 14 may comprise a pneumatic actuator or an electrical actuator that, responsive to pressurized air or fluid or responsive to an electrical input, functions to extend and retract a rod to impart a longitudinal movement of the collet relative to the collar. Optionally, pressurized fluid is used to extend the rod and a spring or other biasing member is used to retract the rod.

Likewise, the flaring actuator 16 may comprise any suitable actuator, such as any suitable linear actuator or the like. For example, the flaring actuator 16 may comprise a pneumatic actuator or an electrical actuator that, responsive to pressurized air or fluid or responsive to an electrical input, functions to extend and retract a rod to impart a longitudinal movement of the mandrel holder and mandrel relative to the collapsed collet and held tube. Optionally, pressurized fluid is used to extend the rod and a spring or other biasing member is used to retract the rod.

Thus, the hand held flaring tool of the present invention provides a hand held tool that a user can readily hold and use during the process of clamping onto and engaging an end of a tube or pipe, such as a metallic tube or pipe of a vehicle (such as a brake line or the like). The flaring tool may be used by a user at the vehicle to flare an end of a pipe or tube that is already installed at the vehicle, thereby easing repair work on the tube or pipe or system. The flaring tool may automatically limit the insertion of the end of the tube or pipe to a position that is correct or appropriate for proper flaring of the end of the tube by the flaring mechanism. The flaring mechanism may then be actuated to flare the end of the held tube and, if desired, the flaring mandrel may be readily moved or removed from the tool, without requiring disassembly of the flaring tool. When the flaring process or processes is/are completed, the flaring tool resets to a configuration for receiving a new tube or pipe therein and for limiting or stopping insertion of the tube or pipe at the desired or appropriate position for the next flaring process or processes.

Therefore, the automatic tube flaring device or tool of the present invention operates to flare the end of a tube, such as a brake line or the like for an automobile, so that the tube may be pressed into engagement with a fitting and secured thereto via a fastener or the like. Typically, the process of flaring a brake line involves first imparting a bubble flare expansion at or near the end of the tube and then forming the flared end via a conical flaring element. Typically, such tools require manually holding on to the die or the like that holds the tube and pressing the flaring tool against the end of the tube and rotating the tube or tool to form the desired end flare.

Changes and modifications to the specifically-described embodiments may be carried out without departing from the principles of the present invention, which is intended to be limited only by the scope of the appended claims, as interpreted according to the principles of patent law, including the doctrine of equivalents.

The invention claimed is:
1. A hand held flaring tool for flaring an end of a pipe or tube, said hand held flaring tool comprising:

a receiving portion configured for receiving a tube therein for flaring an end of the tube;
a locking mechanism operable to lock the tube at said receiving portion when the tube is inserted into said locking mechanism;
wherein said locking mechanism comprises a collar that is configured to receive a collet therein and to urge said collet radially inward to clamp onto the tube as the collet is moved longitudinally relative to said collar and along a longitudinal axis of said collar from an open position, where the tube is movably disposed in said collet, and a clamping position, where the tube is clamped in said collet;
wherein said collet comprises first and second collet pieces each having a generally concave internal surface and a larger diameter flange for engaging said collar as said collet is moved from the open position to the clamping position in said collar during the locking process;
wherein said collet pieces are movably disposed in a collet body and are radially and pivotally movable relative to said collet body and said collar;
wherein said collet pieces radially move within said collet body and also pivotally move within said collet body as said collet pieces move between the opened position and the clamping position;
wherein the flange of each collet piece comprises a curved surface that has a first shoulder that engages a curved or ramped surface of said collar when said collet is in the open position and a second shoulder that engages said curved or ramped surface of said collar when said collet is moved toward the clamping position;
wherein said first shoulder is at a first angle relative to the longitudinal axis of said collar and wherein said second shoulder is at a second angle relative to the longitudinal axis of said collar, and wherein said first angle is greater than said second angle;
wherein said first shoulder is configured to engage said curved or ramped surface of said collar to guide insertion of said collet into said collar and to initially radially urge said collet pieces inward when said collet is longitudinally moved relative to said collar from the open position toward the clamping position;
wherein each of said collet pieces pivots about a first pivot axis that is normal to the longitudinal axis of said collar when said collet pieces are initially radially urged inward toward the clamping position;
wherein said second shoulder causes said collet pieces to move radially inward as said collet is further longitudinally moved relative to said collar toward the clamping position to clamp said collet pieces onto the tube to hold the tube relative to the collet when said collet is in the clamping position;
wherein the first pivot axis of said collet piece radially moves relative to said collet body and said collar as said collet pieces move further toward and into the clamping position; and
a flaring mechanism operable, when said collet is clamped onto the tube, to move a flaring mandrel towards the end of the tube, whereby the flaring mandrel engages and flares the end of the tube.
2. The flaring tool of claim 1, wherein said collet comprises an internal biasing element that urges said collet pieces radially away from the tube when said collet is positioned relative to said collar at a location that allows for expansion of said collet.

3. The flaring tool of claim 1, wherein each of said collet pieces pivots about a second pivot axis of said collet pieces as said collet pieces move further toward and into the clamping position.

4. The flaring tool of claim 1, wherein, when said collet is at the clamping position, said second angles of said second shoulders of said collet pieces are approximately 10 degrees relative to the longitudinal axis of said collar.

5. The flaring tool of claim 2, wherein said locking mechanism comprises a lever arm that is pivotable via actuation of a locking actuator that is operable to impart a longitudinal movement of said collet into said collar toward the clamping position to thereby urge said collet pieces towards one another to clamp said collet onto the tube to clamp and secure the tube relative to said collet and said receiving portion.

6. The flaring tool of claim 1, further comprising a mandrel slide configured to support two flaring mandrels and wherein said mandrel slide is selectively movable to move a selected one of the flaring mandrels into position at a mandrel holder of said flaring mechanism.

7. The flaring tool of claim 6, further comprising a trigger interlock element configured to limit actuation of said flaring mechanism when one of the flaring mandrels is not positioned at said mandrel holder.

8. The flaring tool of claim 6, wherein said mandrel slide is accessible through a window of said receiving portion to allow a user to move said mandrel slide and said mandrels without disassembling said flaring tool.

9. The flaring tool of claim 1, comprising a stop element and wherein, after a user actuates said flaring mechanism to move the flaring mandrel, said stop element is movable to be disposed behind the flaring mandrel to limit retraction of said flaring mechanism, and wherein, when said stop element is disposed behind the flaring mandrel, the flaring mandrel is at a position to set the insertion depth of the tube.

10. The flaring tool of claim 1, wherein said generally concave internal surfaces of said collet pieces comprise partial cylindrical surfaces.

11. The flaring tool of claim 10, wherein said partial cylindrical surfaces comprise a plurality of ribs.

12. A hand held flaring tool for flaring an end of a pipe or tube, said flaring tool comprising:
- a receiving portion configured for receiving a tube therein;
- a locking mechanism disposed at said receiving portion and having a collar and a collet, wherein said locking mechanism is operable to lock the tube at said receiving portion when the tube is inserted therein;
- said collet comprising first and second collet pieces each having a recessed internal surface for engaging the tube and an external flange for engaging said collar as said collet is moved relative to said collar;
- wherein said collet pieces are radially movable relative to said collar and are pivotally movable relative to said collar about pivot axes that are normal to the longitudinal axis of said collar;
- said flange of each of said collet pieces comprising first and second flange portions that sequentially engage an inner surface portion of said collar as said collet pieces move relative to said collar;
- wherein said first flange portion is configured to guide insertion of said collet into said collar and wherein each of said collet pieces pivots about a first pivot axis relative to said collar when said first flange portion engages inner surface portion of said collar;
- wherein engagement of said second flange portion with said inner surface portion of said collar causes said collet pieces to pivot about a second pivot axis relative to said collar to substantially clamp onto the tube to thereby hold the tube relative to the collet;
- wherein said first and second pivot axes are at opposite end regions of the respective collet piece; and
- a flaring mechanism operable to move a flaring mandrel towards the end of the tube when said collet is clamped onto the tube, whereby the flaring mandrel engages and flares the end of the tube.

13. The flaring tool of claim 12, wherein said first and second flange portions of said collet pieces comprise first and second ramps, and wherein said first ramp is at a first angle relative to a longitudinal axis of said collet and said second ramp is at a second angle relative to the longitudinal axis of said collet, and wherein said first angle is greater than said second angle.

14. The flaring tool of claim 13, wherein said inner surface portion of said collar comprises a curved internal surface of said collar.

15. The flaring tool of claim 12, wherein said collet comprises an internal biasing element configured to urge said collet pieces away from the tube when said second flange portions disengage said inner surface portion of said collar to allow for expansion of said collet.

16. The flaring tool of claim 15, wherein said collet pieces are movably and pivotally disposed in a collet body and are radially and pivotally movable within said collet body as said collet pieces move between an opened position and a clamping position.

17. The flaring tool of claim 12, wherein said locking mechanism comprises a lever arm that is pivotable via actuation of a locking actuator that is operable to impart a longitudinal movement of said collet relative to said collar to urge said collet pieces toward one another to thereby clamp onto the tube and hold the tube relative to the collet.

18. The flaring tool of claim 12, further comprising a mandrel slide configure to support two flaring mandrels, and wherein said mandrel slide is selectively movable to move a selected one of the two flaring mandrels into position at a mandrel holder of said flaring mechanism.

19. The flaring tool of claim 18, further comprising a trigger interlock element configured to limit actuation of said flaring mechanism when one of the two flaring mandrels is not positioned at said mandrel holder.

20. The flaring tool of claim 12, further comprising a stop element that is movable to a position disposed behind the flaring mandrel after a user actuates said flaring mechanism to move the flaring mandrel, whereby said stop element is operable to limit retraction of said flaring mechanism, with the flaring mandrel at a position to set the insertion depth of the tube.

* * * * *